(12) United States Patent
Edwards

(10) Patent No.: US 11,466,715 B2
(45) Date of Patent: Oct. 11, 2022

(54) CONNECTOR ASSEMBLY

(71) Applicant: Lear Corporation, Southfield, MI (US)

(72) Inventor: Chris J. Edwards, Burton on Trent (GB)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/890,068

(22) Filed: Jun. 2, 2020

(65) Prior Publication Data

US 2021/0372447 A1  Dec. 2, 2021

(51) Int. Cl.
*F16B 5/06* (2006.01)

(52) U.S. Cl.
CPC .......... *F16B 5/0664* (2013.01); *F16B 5/0642* (2013.01)

(58) Field of Classification Search
CPC ........ F16B 5/0664; F16B 5/0642; F16B 5/06; F16B 5/065; B60R 13/0206
See application file for complete search history.

(56) References Cited

U.S. PATENT DOCUMENTS

| | | | |
|---|---|---|---|
| 2,301,116 A * | 11/1942 | Gusbeth ................. | E05C 19/08 292/286 |
| 3,613,178 A * | 10/1971 | Fisher .................... | F16B 12/26 220/529 |
| 4,534,088 A | 8/1985 | Rieke | |
| 4,874,276 A | 10/1989 | Iguchi | |
| 5,407,310 A * | 4/1995 | Kassouni ............... | B29C 70/76 29/525.02 |
| 5,468,109 A | 11/1995 | Ferrari et al. | |
| 5,570,984 A * | 11/1996 | Reznikov ............... | F16B 21/02 411/551 |
| 5,754,412 A * | 5/1998 | Clavin ................... | H05K 7/142 174/138 D |
| 6,976,292 B2 | 12/2005 | MacPherson et al. | |
| 8,875,357 B2 | 11/2014 | Reznar et al. | |
| 9,097,270 B2 | 8/2015 | Roman | |
| 10,464,501 B2 * | 11/2019 | Pinon Perez ............ | F16B 5/06 |
| 2006/0239772 A1 * | 10/2006 | Kuroda ................. | F16B 5/0657 403/329 |
| 2009/0241305 A1 * | 10/2009 | Buckingham ........ | B60N 2/2863 24/599.1 |
| 2013/0312232 A1 * | 11/2013 | Fujiwara ............... | G03B 17/566 24/572.1 |

* cited by examiner

*Primary Examiner* — David M Upchurch

(74) *Attorney, Agent, or Firm* — Fishman Stewart PLLC

(57) ABSTRACT

A connector assembly may include a body including a first aperture and a second aperture; a rotating member disposed at least partially in the first aperture; and/or a mating member having a portion disposed at least partially in the second aperture. The rotating member may be configured to rotate to limit movement of the mating member.

20 Claims, 22 Drawing Sheets

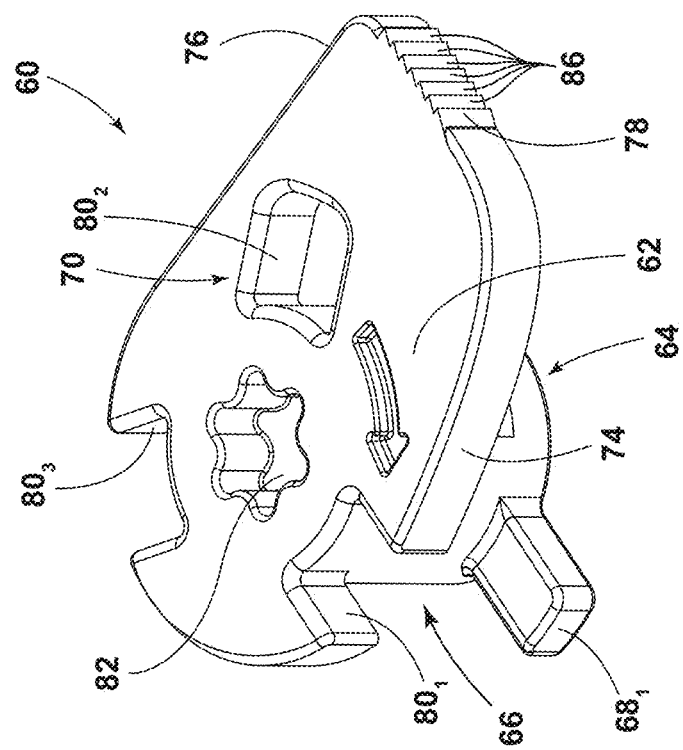
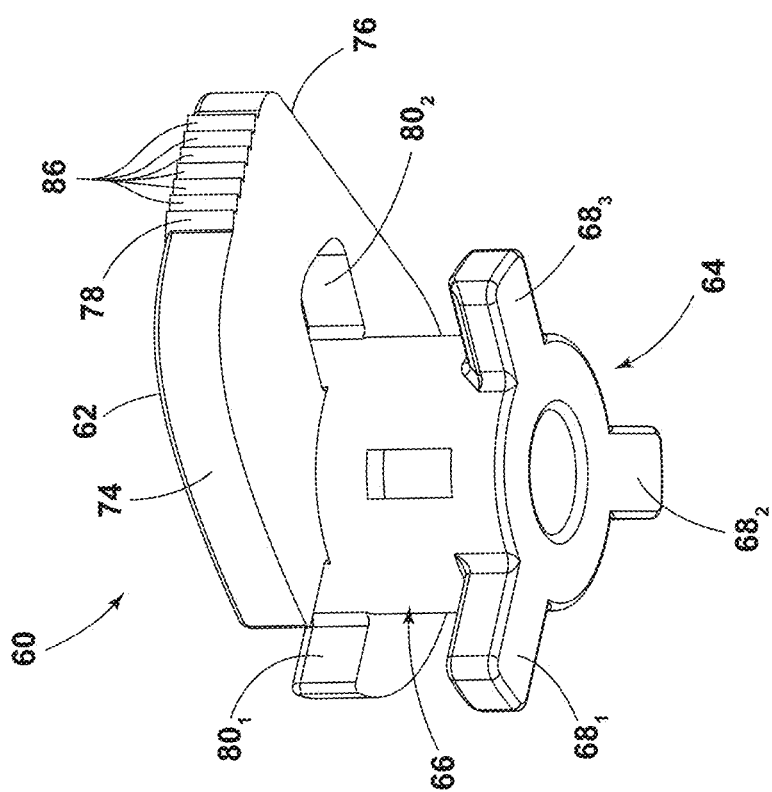
FIG. 4B
FIG. 4A

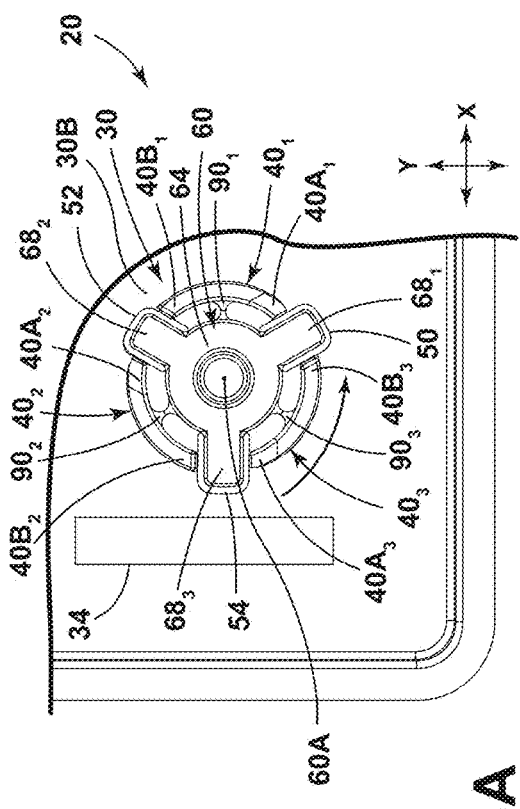
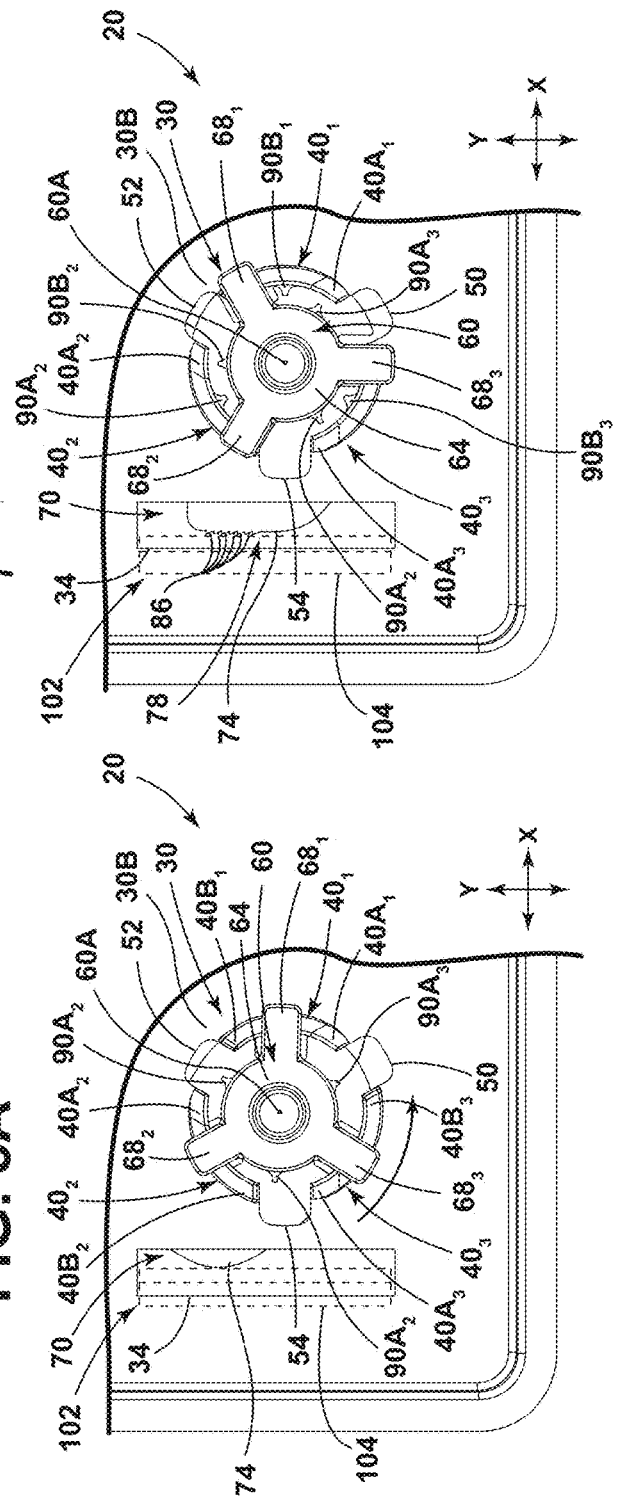
FIG. 8A
FIG. 8B
FIG. 8C

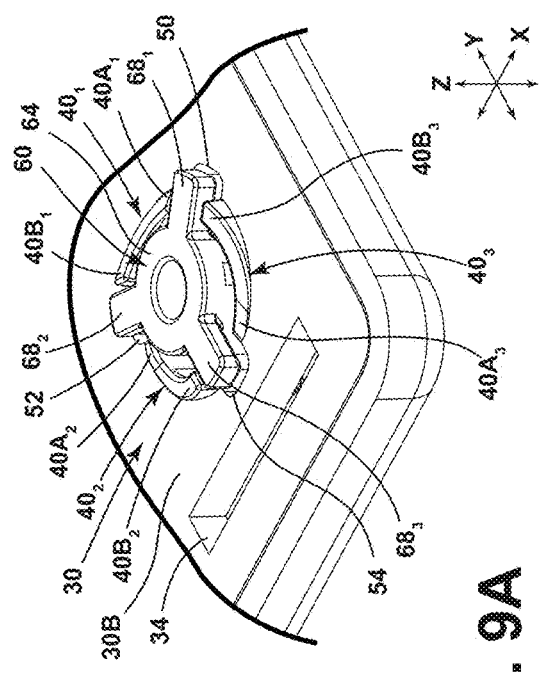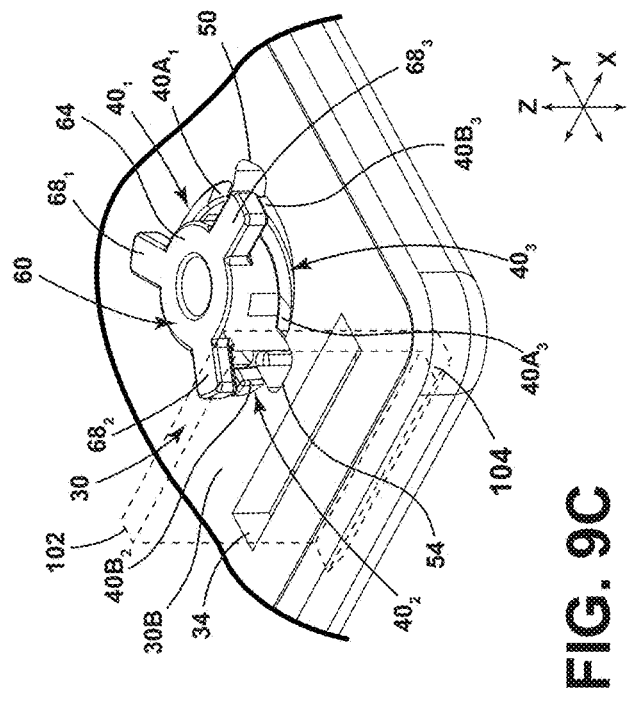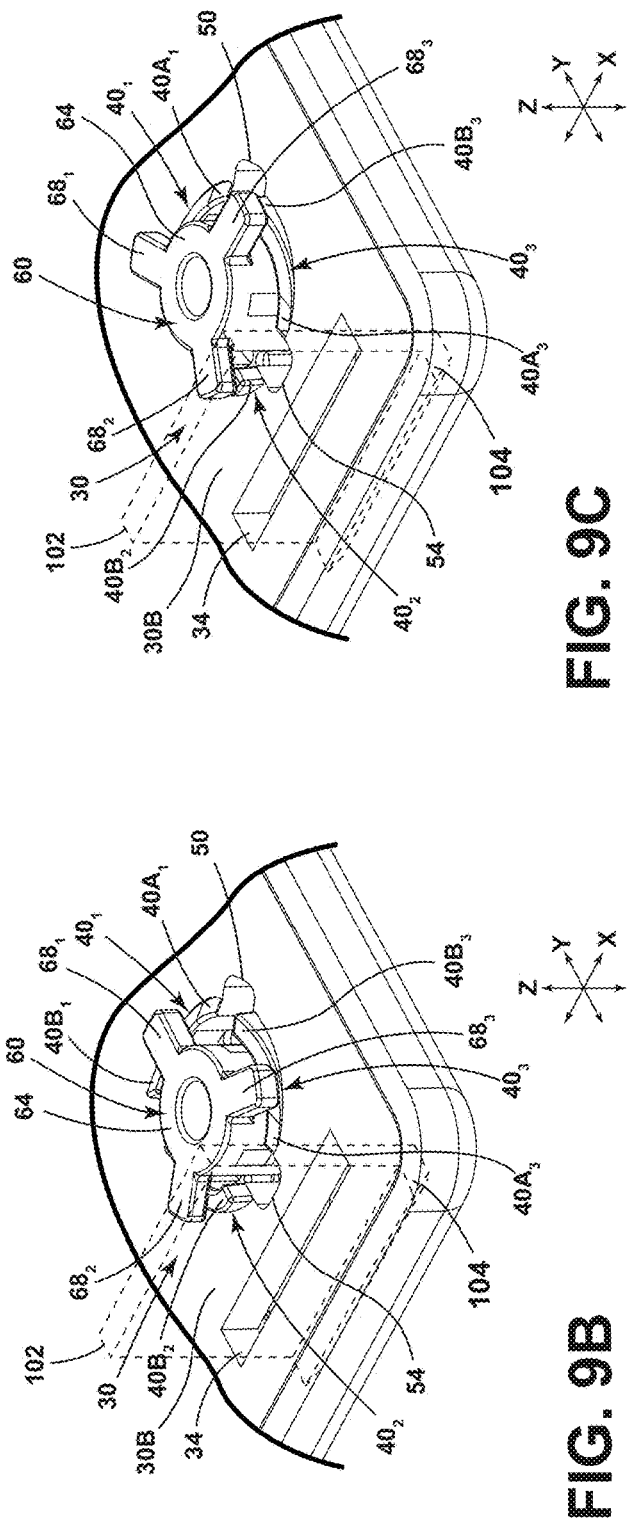

CONNECTOR ASSEMBLY

TECHNICAL FIELD

The present disclosure generally relates to connector assemblies, including connector assemblies that may be utilized with limiting disengagement of a mating member from a body via a rotating member.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some connector assemblies may involve snap connectors that may not provide sufficient connection assurance and/or that may not be sufficiently restricted from moving upon connection, which may result in incomplete assembly and/or unintended disconnection.

There is a desire for solutions/options that minimize or eliminate one or more challenges or shortcomings of connector assemblies. The foregoing discussion is intended only to illustrate examples of the present field and is not a disavowal of scope.

SUMMARY

In embodiments, a connector assembly may include a body including a first aperture and a second aperture, a rotating member disposed at least partially in the first aperture, and/or a mating member having a portion disposed at least partially in the second aperture. The rotating member may be configured to rotate to limit movement of the mating member.

With embodiments, a connector assembly may include a body including a first aperture, a mating member, and/or a rotating member disposed at least partially in the first aperture and configured to restrict relative movement between the body and the mating member. The rotating member may include a body portion, a head connected to a first end of the body portion, and/or a plurality of protrusions extending radially outward from the body portion at or about a second end of the body portion. The protrusions may be configured to engage respective contact portions of the body or the mating member.

In embodiments, a method of operating a connector assembly including a body, a rotating member, and a mating member may include disposing the rotating member at least partially in a first aperture of the body, rotating the rotating member in the first aperture such that protrusions of the rotating member engage contact portions of the body or of the mating member, the contact portions extending substantially in an axial direction of the rotating member, and/or restricting, via the rotating member, relative movement between the body and the mating member.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIGS. 4A and 4B are perspective views generally illustrating embodiments of a rotating member according to teachings of the present disclosure.

FIG. 8A is a bottom view generally illustrating portions of an embodiment of a connector assembly in an unlocked position according to teachings of the present disclosure.

FIG. 8B is a bottom view generally illustrating portions of an embodiment of a connector assembly in between a fully unlocked position and a fully locked position according to teachings of the present disclosure.

FIG. 8C is a bottom view generally illustrating portions of an embodiment of a connector assembly in a locked position according to teachings of the present disclosure.

FIG. 9A is a perspective view generally illustrating portions of an embodiment of a connector assembly in an unlocked position according to teachings of the present disclosure.

FIG. 9B is a perspective view generally illustrating portions of an embodiment of a connector assembly in between a fully unlocked position and a fully locked position according to teachings of the present disclosure.

FIG. 9C is a perspective view generally illustrating portions of an embodiment of a connector assembly in a locked position according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
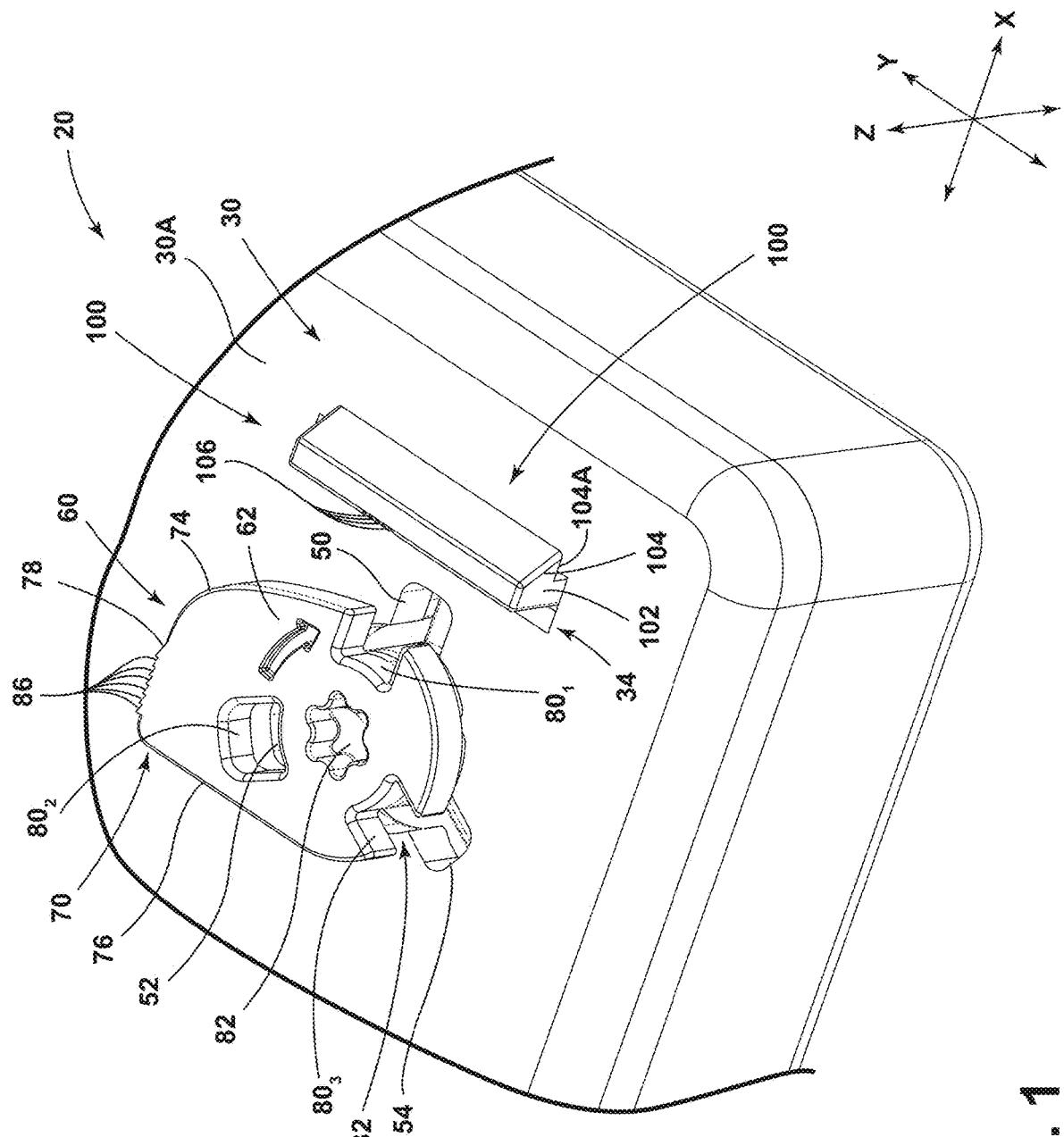
FIG. 1 is a perspective view generally illustrating portions of an embodiment of a connector assembly in an unlocked position according to teachings of the present disclosure.
Figure 2:
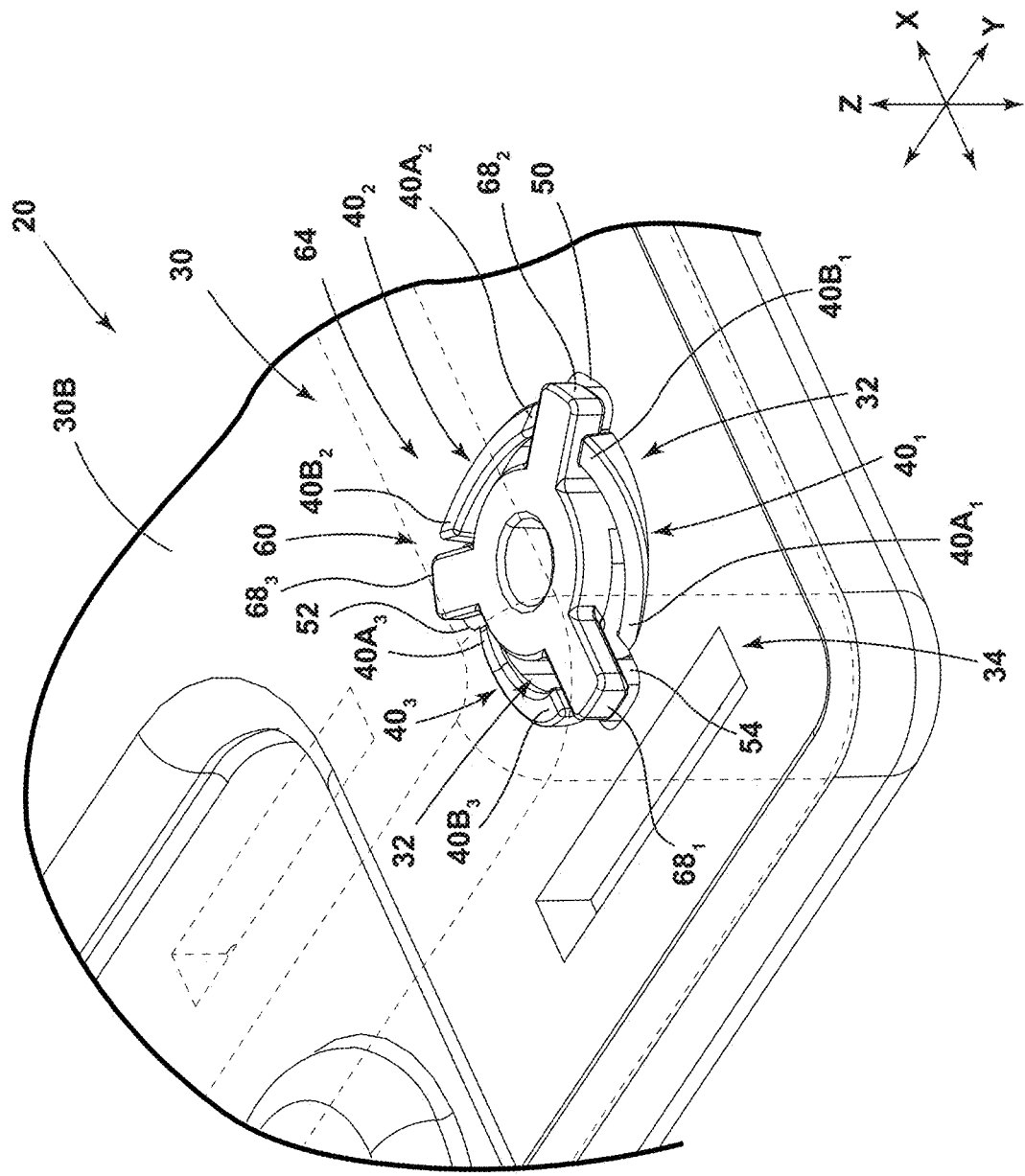
FIG. 2 is a perspective view generally illustrating portions of an embodiment of a connector assembly in an unlocked position according to teachings of the present disclosure.

With embodiments, such as generally illustrated in FIGS. 1 and 2, a connector assembly 20 may include a body 30, a rotating member 60, and/or a mating member 100. The connector assembly 20 may be configured to substantially retain the mating member 100 with the body 30 via the rotating member 60. The rotating member 60 may move between an unlocked position and a locked position in which the rotating member 60 retains the mating member 100 with the body 30 (e.g., limits relative movement of the mating member 100 and the body 30). The rotating member 60 may be disposed at least partially within the body 30.

In embodiments, a body 30 of a connector assembly 20 may include one or more of a variety of shapes, sizes, and/or configurations. For example and without limitation, the body 30 may be substantially planar and/or may be configured as (or a portion of) a housing, a retaining formation, a cover, and/or a structural component, among others, that may be connected with the mating member 100. The body 30 may include a first aperture 32 and/or a second aperture 34. The first aperture 32 may be configured to at least partially receive the rotating member 60 (e.g., may be configured as a through hole). The second aperture 34 may be configured to at least partially received the mating member 100 (e.g., may be configured as through hole). The first aperture 32 may include one or more of a variety of shapes, sizes, and/or configurations. For example and without limitation, the first aperture 32 may be substantially circular. In some circumstances, the rotating member 60 may be formed at least partially within the first aperture 32. The second aperture 34 may include one or more of a variety of shapes, sizes, and/or configurations. For example and without limitation, the second aperture 34 may be substantially rectangular. Movement of the mating member 100 with respect to the body 30 (e.g., the second aperture 34) may be at least partially restricted and/or limited by the rotating member 60, at least in some configurations/positions of the rotating member 60.

With embodiments, a body 30 may include a first side 30A and/or a second side 30B. The first side 30A may be disposed opposite the second side 30B. The first side 30A of the body 30 may include one or more contact portions $40_N$ (see, e.g., FIG. 2). For example and without limitation, the body 30 may include a first contact portion $40_1$, a second contact portion $40_2$, and/or a third contact portion $40_3$. The contact portions $40_N$ may extend from the second side 30B of the body 30 in the Z-direction. The contact portions $40_N$ may include one or more of a variety of shapes, sizes, and/or configurations. For example and without limitation, the contact portions 40 may be substantially curved and/or rounded (e.g., about an axis extending through the first aperture 32 substantially perpendicular to the body 30). The contact portions $40_N$ may be disposed at or about a periphery of the first aperture 32 and/or may be substantially equally spaced (e.g., circumferentially) from each other. The contact portions $40_N$ may include respective first ends $40A_1$, $40A_2$, $40A_3$ and/or second ends $40B_1$, $40B_2$, $40B_3$. The first ends $40A_N$ may be opposite the second ends $40B_N$. The contact portions $40_N$ may be inclined, ramped, and/or tapered such that the first ends $40A_N$ of the contact portions 40 may extend from the second side 30B of the body 30 a shorter distance than the second ends 40B of the contact portions $40_N$.

In embodiments, such as generally illustrated in FIGS. 1, 2, 4A, and 4B, a body 30 may include one or more recesses 50, 52, 54. For example and without limitation, the body 30 may include a first recess 50, a second recess 52, and/or a third recess 54. The recesses 50, 52, 54 may include one or more of a variety of shapes, sizes, and/or configurations. For example and without limitation, the recesses 50, 52, 54 may be substantially square and/or rectangular. The recesses 50, 52, 54 may be disposed at least partially between the contact portions 40 (e.g., circumferentially), may extend radially outward from the first aperture 32, and/or may extend through the body 30 (e.g., in a Z-direction). For example and without limitation, the first recess 50 may be disposed at least partially between the first end $40A_1$ of the first contact portion $40_1$ and the second end $40B_3$ of the third contact portion $40_3$, the second recess 52 may be disposed at least partially between the second end $40B_1$ of the first contact portion $40_1$ and the first end $40A_2$ of the second contact portion $40_2$, and/or the third recess 54 may be disposed at least partially between the second end $40B_2$ of the second contact portion $40_2$ and the first end $40A_3$ of the third contact portion $40_3$. The recesses 50, 52, 54 may be configured to at least partially receive the rotating member 60 (e.g., protrusions $68_N$ of the rotating member 60).

With embodiments, such as generally illustrated in FIGS. 1, 2, 3, 4A, 4B, 5A, 5B, and 6, a rotating member 60 may be disposed at least partially in the first aperture 32. The rotating member 60 may include one or more of a variety of shapes, sizes, and/or configurations. For example and without limitation, the rotating member 60 may be substantially cylindrical. The rotating member 60 may include a first portion/head 62, a second portion 64 (e.g., a lower portion), and/or a third portion 66 (e.g., a middle or body portion). The first portion 62 may be disposed at least partially on the first side 30A of the body 30. The second portion 64 may be disposed at least partially at the second side 30B of the body 30. The second portion 64 may be configured to contact the contact portions 40$_N$. The first portion 62 may be configured to contact the mating member 100. The third portion 66 may be disposed at least partially between the first portion 62 and the second portion 64 (e.g., in an axial direction). The third portion 66 may be disposed at least partially in the first aperture 32 and may include an outer diameter than is smaller than a diameter of the first aperture 32.

In embodiments, such as generally illustrated in FIGS. 2, 4A, 4B, 5A, and 5B, the second portion 64 of the rotating member 60 may include one or more protrusions 68$_N$. For example and without limitation, the rotating member 60 may include a first protrusion 68$_1$, a second protrusion 68$_2$, and/or a third protrusion 68$_3$. The protrusions 68$_N$ may include one or more of a variety of shapes, sizes, and/or configurations. For example and without limitation, the protrusions 68$_N$ may be substantially rectangular. The protrusions 68$_N$ may include a size and/or shape substantially similar to the size and/or shape of the recesses 50, 52, 54 such that the protrusions 68$_N$ may be configured to be disposed at least partially within the recesses 50, 52, 54 and/or such that the rotating member 60 may be removed from (and/or inserted into) the body 30 by sliding the protrusions 68$_N$ through the recesses 50, 52, 54 (e.g., in a Z-direction). The protrusions 68$_N$ may extend from the rotating member 60 substantially in a radial direction. The protrusions 68$_N$ may, for example, be disposed equally (e.g., circumferentially) about the periphery of the second portion 64 of the rotating member 60 and/or may be spaced in a manner consistent with the spacing of the recesses 50, 52, 54. For example and without limitation, the first protrusion 68$_1$ may be disposed about 120 degrees from the second protrusion 68$_2$ and/or the third protrusion 68$_3$. The protrusions 68$_N$ may extend outward from the rotating member 60 at a distance such that the protrusions 68$_N$ may engage the contact portions 40$_N$ of the body 30 when the rotating member 60 is rotated.

Figure 3:
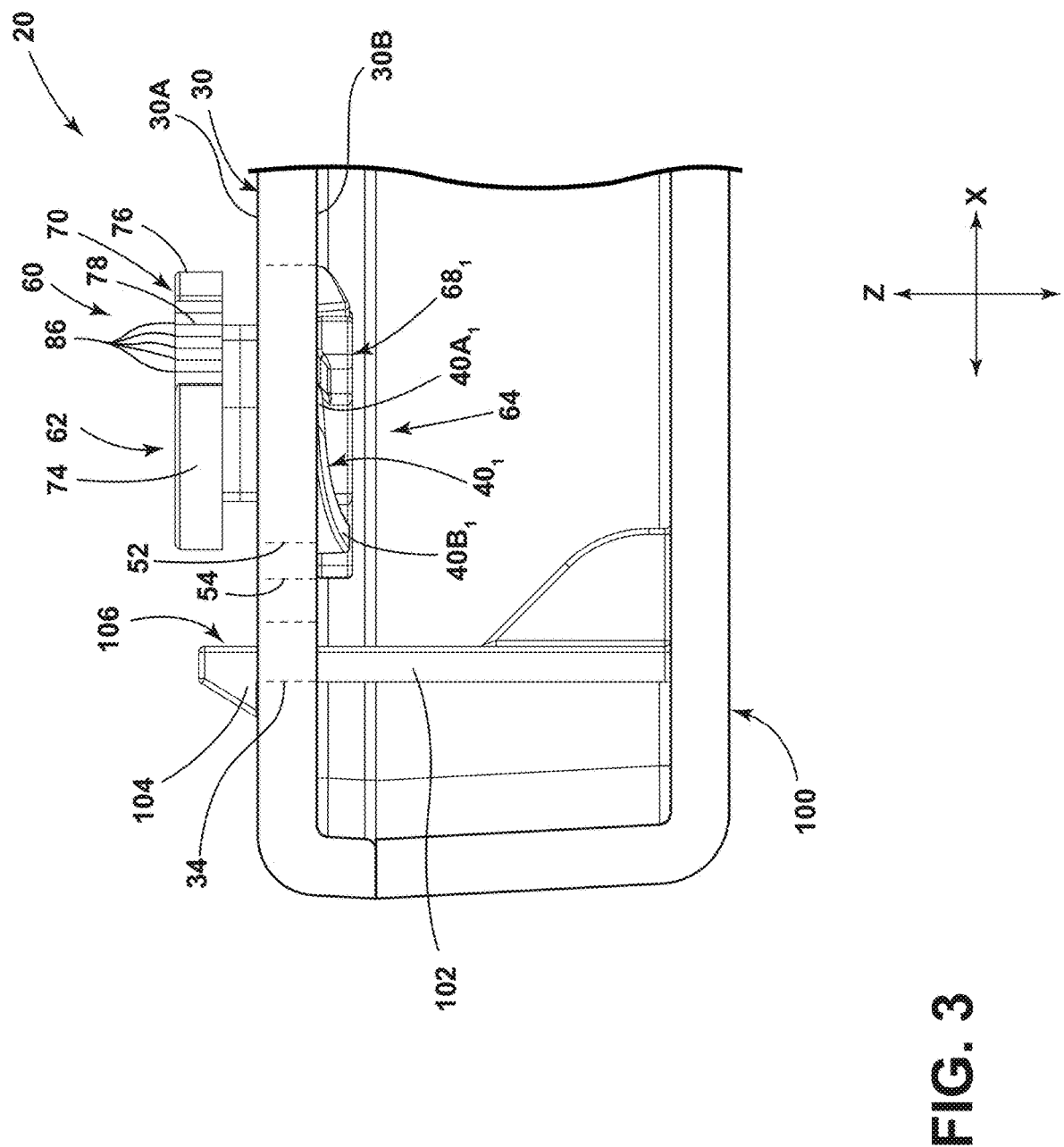
FIG. 3 is a side view generally illustrating portions of an embodiment of a connector assembly in an unlocked position according to teachings of the present disclosure.
Figure 5A:
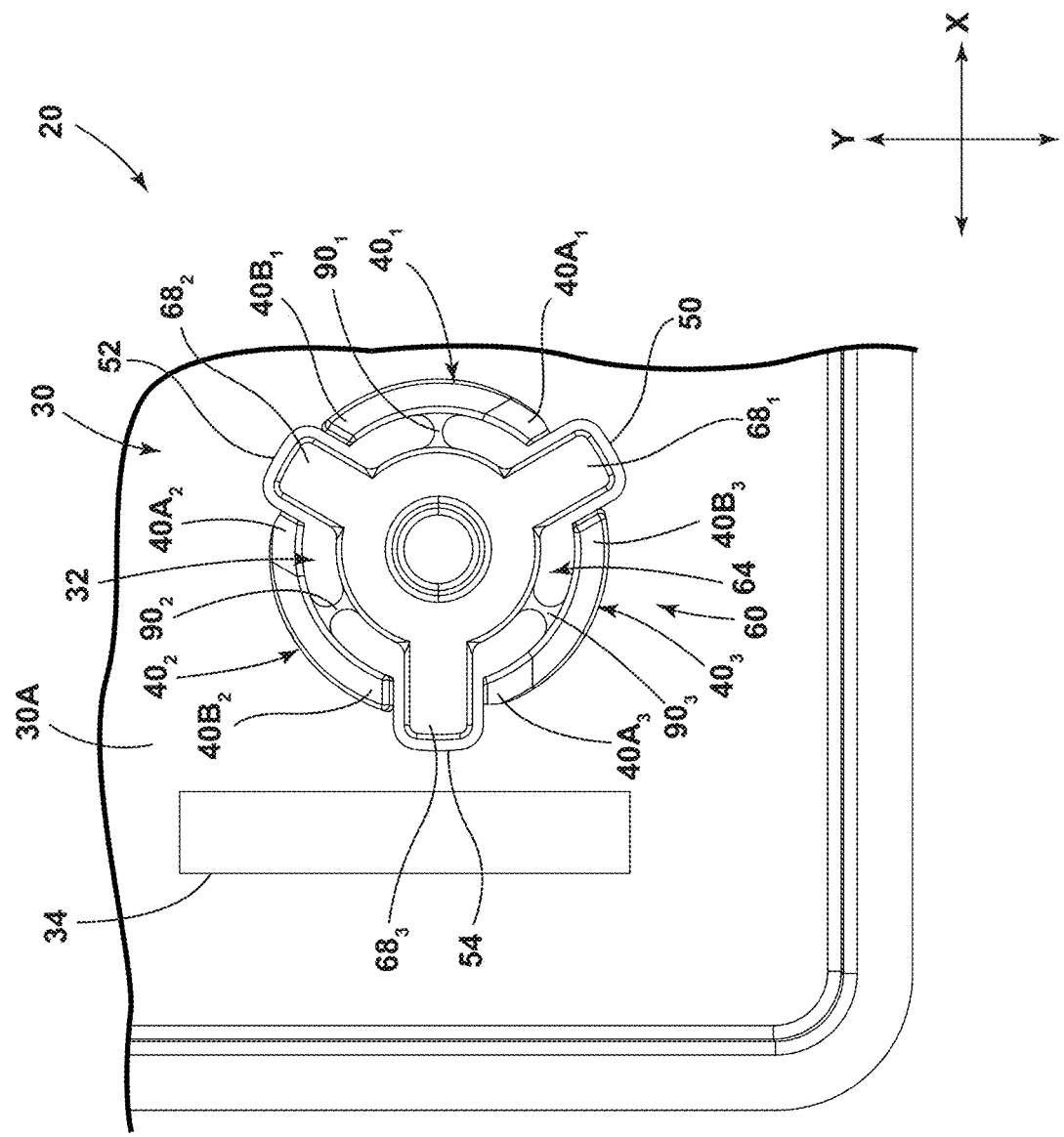
FIG. 5A is a bottom view generally illustrating portions of an embodiment of a connector assembly in an unlocked position according to teachings of the present disclosure.
Figure 5B:
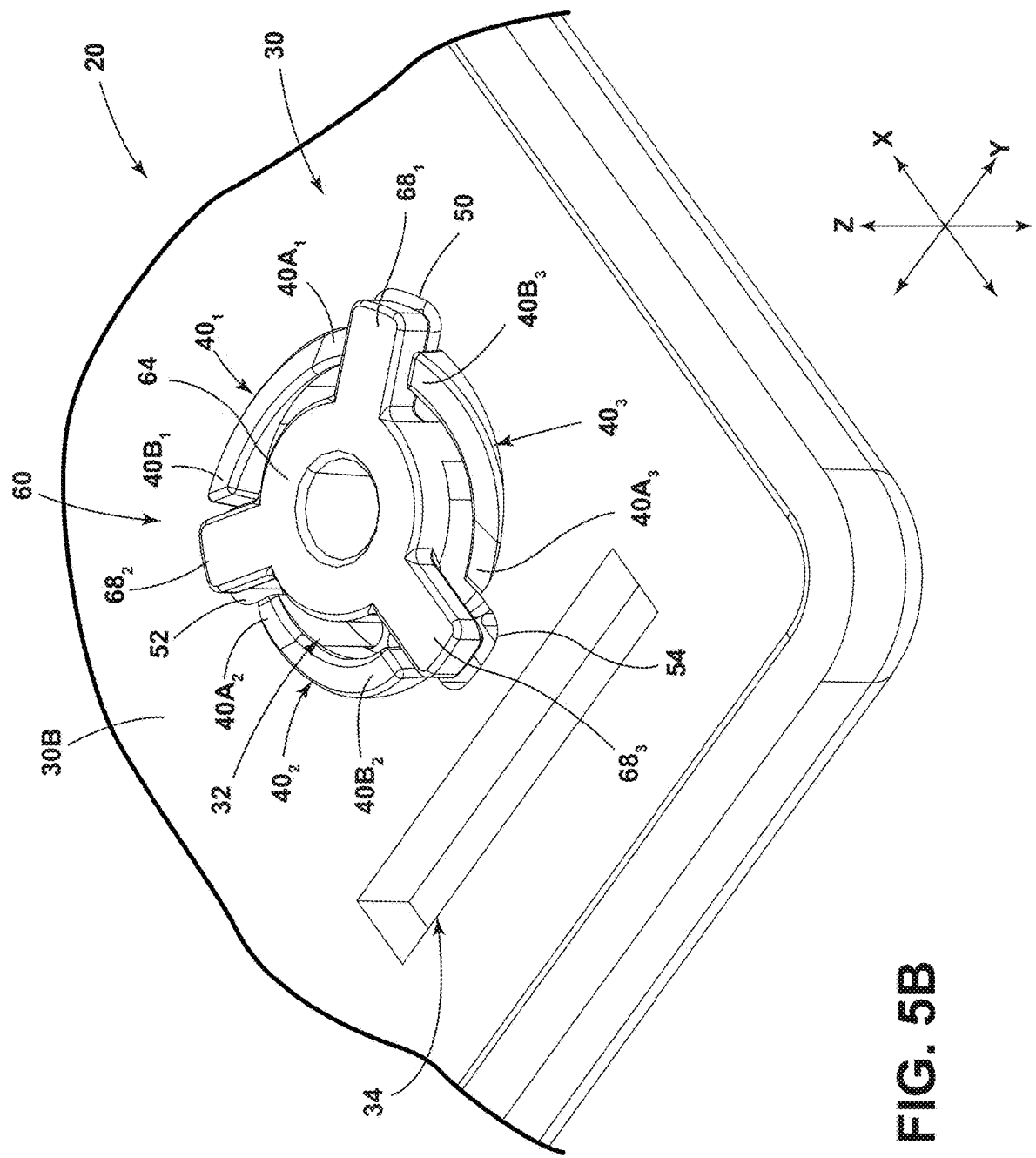
FIG. 5B is a perspective view generally illustrating portions of an embodiment of a connector assembly in an unlocked position according to teachings of the present disclosure.
Figure 6:
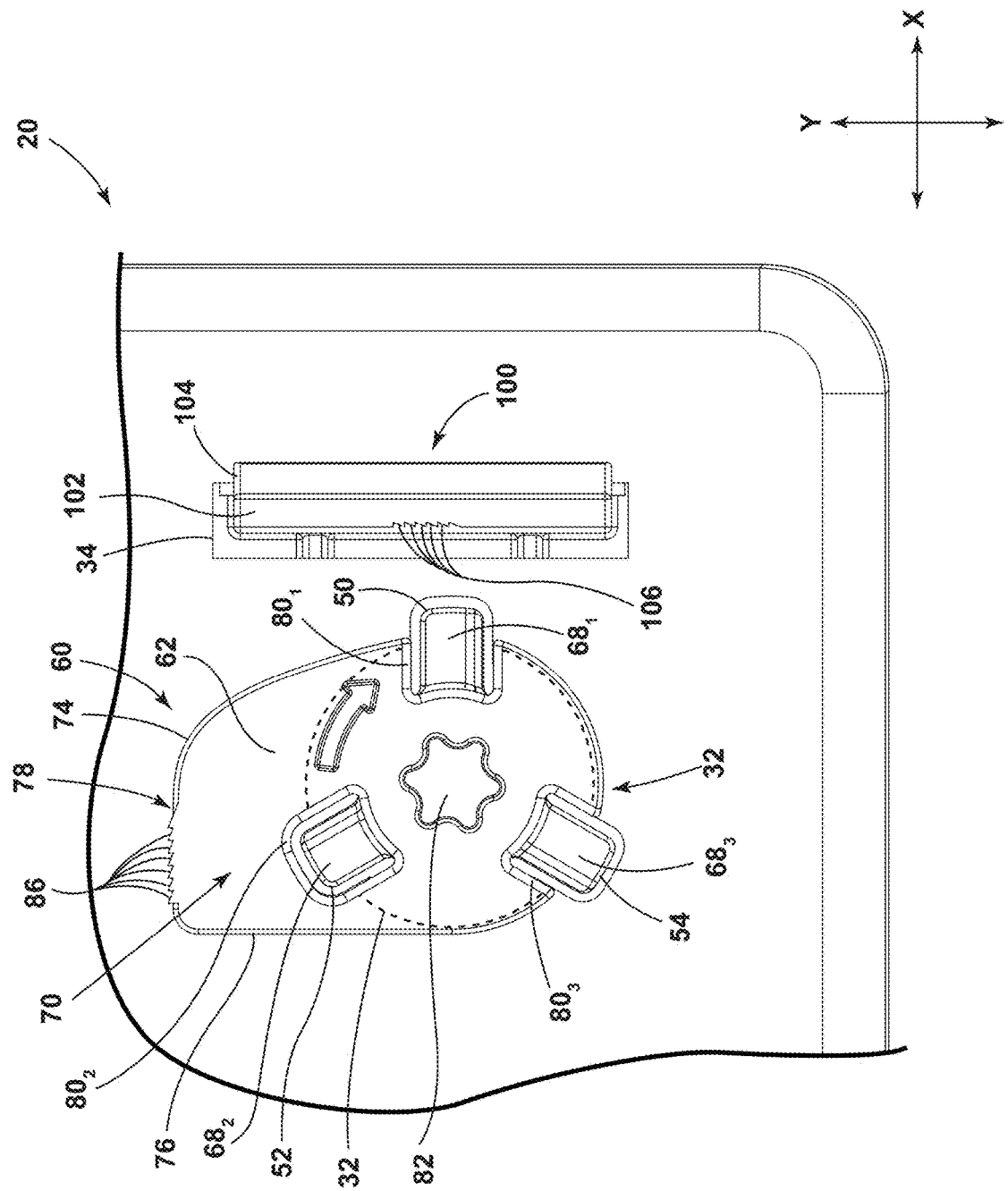
FIG. 6 is a top view generally illustrating portions of an embodiment of a connector assembly in an unlocked position according to teachings of the present disclosure.

With embodiments, such as generally illustrated in FIGS. 1, 3, and 6, the first portion 62 of the rotating member 60 may include a flange 70. The flange 70 may be substantially aligned (e.g., in a Z-direction) with the first portion 62 of the rotating member 60 (e.g., the flange 70 may be generally aligned with an X-Y plane that may extend through the first portion 62). The flange 70 may extend tangentially from the first portion 62 (e.g., which may be generally circular) of the rotating member 60. The flange 70 may include one or more of a variety of shapes, sizes, and/or configurations. For example and without limitation, the flange 70 may be substantially rounded, curved, circular, fin-shaped, semi-circular, trapezoidal, and/or elongated. The flange 70 may include a tapered portion 74, a planar portion 76, and/or a contact surface 78. The tapered portion 74, the planar portion 76, and/or the contact surface 78 may be configured to contact the mating member 100, such as when the rotating member 60 is in or near a locked position.

In embodiments, the rotating member 60 may be configured to rotate in a first direction to move from the unlocked position toward the locked position. Rotation of the rotating member 60 in the first direction may include the tapered portion 74 of the flange 70 being disposed proximate the mating member 100 prior to the contact surface 78 of the flange 70 being disposed proximate the mating member 100.

For example and without limitation, the tapered portion 74 may be tapered/curved to facilitate engagement between the contact surface 78 and the mating member 100. In some configurations, the diameter of the first portion 62 may increase along the tapered portion 74.

Figure 10:
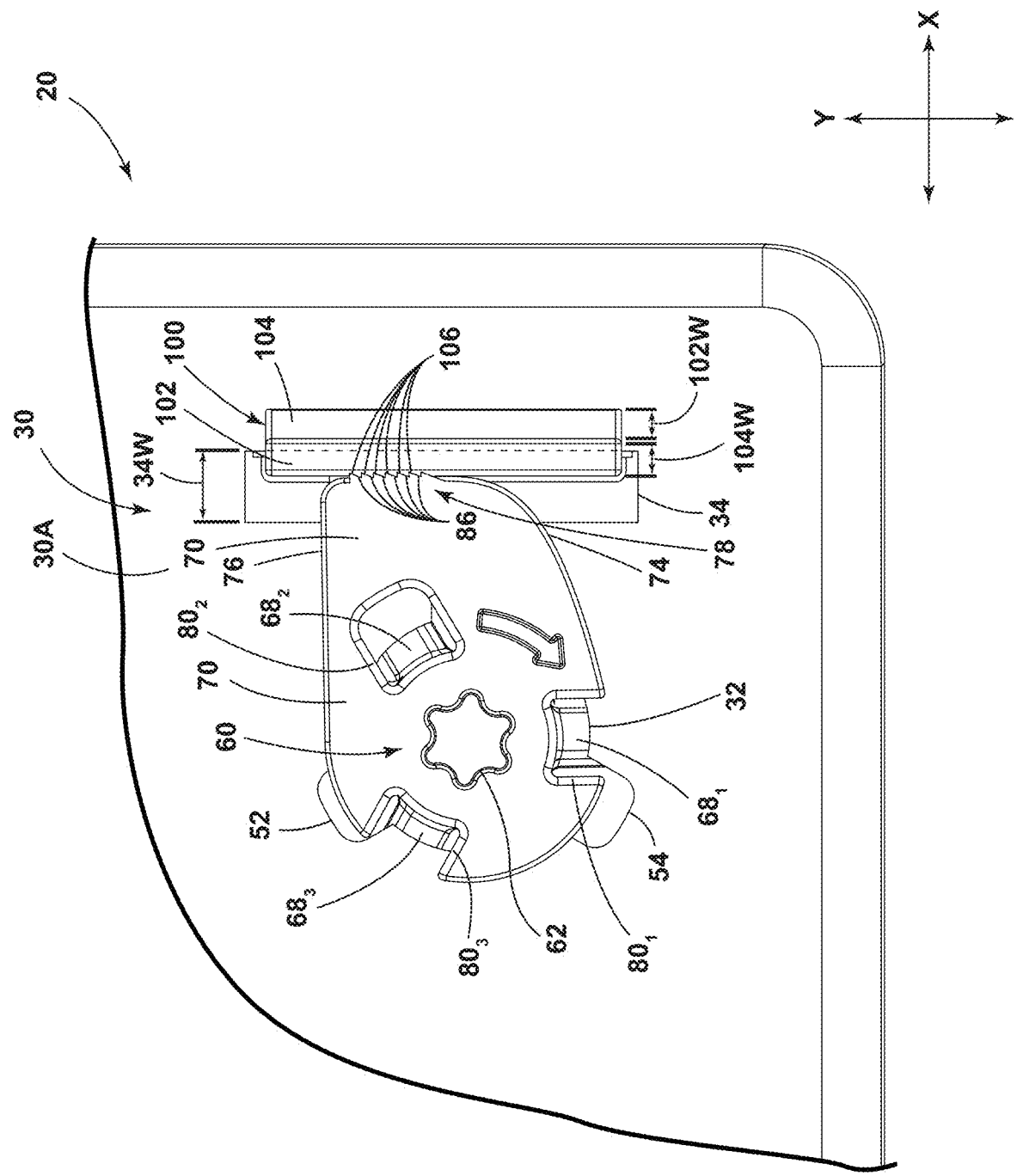
FIG. 10 is a top view generally illustrating portions of an embodiment of a connector assembly in a locked position according to teachings of the present disclosure.

In embodiments, such as generally illustrated in FIGS. 1, 6, and 10, the first portion 62 of the rotating member 60 may include one or more alignment recesses 80$_N$. For example and without limitation, the first portion 62 may include a first alignment recess 80$_1$, a second alignment recess 80$_2$, and/or a third alignment recess 80$_3$. One or more alignment recesses 80$_N$ may be disposed about a periphery of the first portion 62 and/or one or more alignment recesses 80$_N$ may be disposed at a distance from (e.g., radially inward of) the periphery of the first portion 62. The alignment recesses 80$_N$ may, for example and without limitation, be spaced equally (e.g., circumferentially) about the first portion 62. In embodiments, some or all alignment recesses 80$_N$ may substantially aligned (e.g., in an axial/Z-direction) with a respective protrusion 68$_N$.

With embodiments, such as generally illustrated in FIG. 6, when the rotating member 60 is in the unlocked position, the protrusions 68$_N$ and/or the alignment recesses 80$_N$ may be substantially aligned (e.g., in the Z-direction) with the recesses 50, 52, 54. For example and without limitation, some or most portions of each of the protrusions 68$_N$ of the rotating member 60 may be visible through the alignment recesses 80$_N$ and the recesses 50, 52, 54 (e.g., not covered by the body 30) when the rotating member 60 is in the unlocked position, which may provide a visual indication that the rotating member 60 is in the unlocked position.

In embodiments, such as generally illustrated in FIG. 10, in a locked position of the rotating member 60, the protrusions 68$_N$ and/or the alignment recesses 80$_N$ may be substantially offset from (e.g., not aligned in the Z-direction with) the recesses 50, 52, 54. For example and without limitation, some or most portions of each of the protrusions 68$_N$ of the rotating member 60 may not be visible through the alignment recesses 80$_N$ (e.g., may be covered by the body 30) when the rotating member 60 is in the locked position, which may provide a visual indication that the rotating member 60 is in the locked position.

With embodiments, such as generally illustrated in FIGS. 1, 6, and 10, a rotating member 60 may include a formation 82 via which the rotating member 60 may be rotated. The formation 82 may be disposed substantially in or about a center of the rotating member 60. The formation 82 may include one or more of a variety of shapes, sizes, and/or configurations. For example and without limitation, the formation 82 may include a recess or aperture that may be substantially triangular, rectangular, polygonal, cross-shaped (e.g., for a Phillips screwdriver), star-shaped (e.g., for a Torx driver), and/or one or more of a variety of shapes that may be configured to at least partially receive a driver or other device for applying torque to the rotating member 60. Additionally or alternatively, the rotating member 60 may be configured to be rotated by hand. For example and without limitation, a user may rotate the rotating member 60 via the flange 70, such as by applying a force/torque to the planar portion 76 of the flange 70.

In embodiments, such as generally illustrated in FIGS. 1, 3, and 6, the contact surface 78 of the flange 70 may include one or more ridges 86. The ridges 86 may include one or more of a variety of shapes, sizes, and/or configurations. For example and without limitation, the ridges 86 may be substantially triangular and/or ramped (e.g., may be configured as projections and/or teeth). The ridges 86 may extend outward from the flange 70 and/or may be substantially aligned with a Z-direction. One or more ridges 86 may be disposed at an oblique or right angle relative to a circumferential direction. The ridges 86 may be configured to at least partially engage the mating member 100 to limit rotation of the rotating member 60 in a second direction (e.g., an unlocking direction).

Figure 7A:
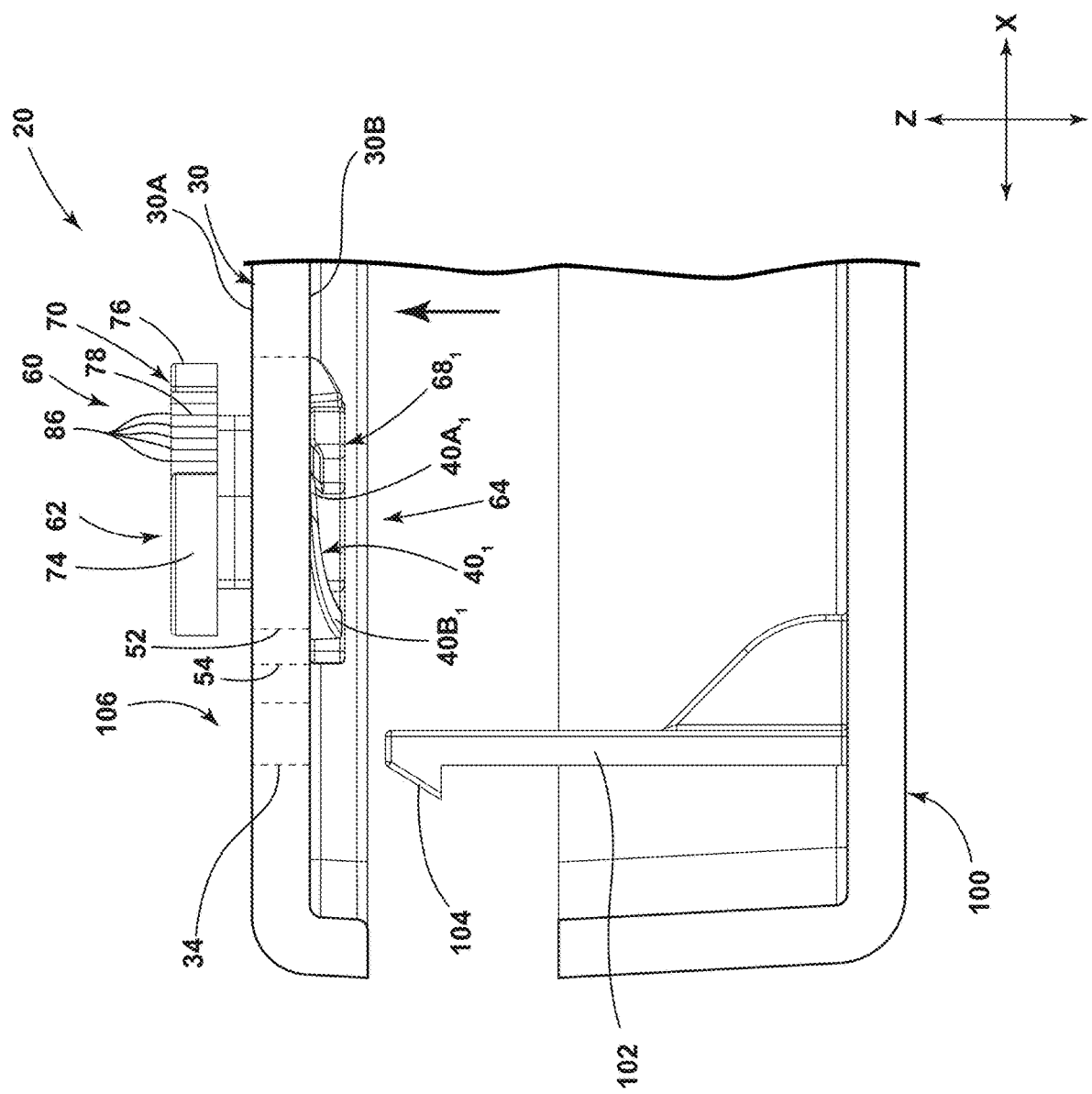
FIGS. 7A and 7B are cross-sectional views generally illustrating portions of an embodiment of a connector assembly in an unlocked position according to teachings of the present disclosure.

With embodiments, such as generally illustrated in FIG. 7A, it may be desirable to connect a body 30 with another component, such as a mating member 100 (a housing, a retaining formation, a cover, a structural component, etc.). The body 30 and the mating member 100 may be configured for connection with each other. For example and without limitation, the mating member 100 may include a latch or clip 102 that may be configured to engage (e.g., be inserted into and snap with) a second aperture 34 of the body 30, which may connect the body 30 and the mating member 100 (see, e.g., FIGS. 7B and 7C). In a latched position of a latch 102, the latch 102 may be at least partially disposed in the second aperture 34 of the body 30. With some embodiments, the mating member 100 may include a plurality of latches or clips 102 that may be configured for engagement with respective second apertures 34 of the body 30.

In embodiments, a latch 102 may include one or more of a variety of shapes, sizes, and/or configurations. For example and without limitation, a latch 102 may be substantially planar and/or rectangular. The latch 102 may include a shape that corresponds to the shape of the second aperture 34 such that the second aperture 34 may be configured to receive the latch 102. The latch 102 may include an engagement portion 104 that may include one or more of a variety of shapes, sizes, and/or configurations. For example and without limitation, the engagement portion 104 may be substantially hook-shaped, curved, and/or triangular. The engagement portion 104 may extend from the latch 102, such as substantially in an X-direction (e.g., away from the rotating member 60 in a connected/latched position). A combined width 102W of the latch 102 and a width 104W of the engagement portion 104 may be less than the width 34W of the second aperture 34 such that the mating member 100 may, at least in some circumstances, move into and/or out of the second aperture 34 (e.g., in a Z-direction).

In embodiments, an engagement portion 104 may include an engagement surface 104A. The engagement surface 104A may be substantially planar. The engagement surface 104A may be configured to contact the first side 30A of the body 30. Contact between the engagement surface 104A and the first side 30A of the body 30 may limit movement of the mating member 100 in the out of the second aperture 34 (e.g., in a Z-direction). The latch 102 may be at least somewhat resilient such that the latch 102 may deform (e.g., deflect, bend, tilt, etc.) toward the rotating member 60 as the latch 102 is inserted into the second aperture 34, and may deform back (e.g., away from the rotating member 60) once the engagement surface 104A is inserted through the second aperture 34 (e.g., the latch 102 may snap into engagement with the body 30 and/or the second aperture 34).

With embodiments, such as generally illustrated in FIGS. 1, 3, and 6, a latch 102 may include one or more grooves 106. The grooves 106 may include one or more of a variety of shapes, sizes, and/or configurations. For example and without limitation, the grooves 106 may be substantially triangular and/or ramped. The grooves 106 extend substantially in a Z-direction on an outer surface of the latch 102, such as opposite the engagement portion 104. The grooves 106 may be disposed such that when rotating the rotating member 60 from the unlocked position to the locked position, the ridges 86 of the rotating member 60 rotate into engagement with the grooves 106 of the mating member 100. Engagement between the ridges 86 and the grooves 106 may limit accidental/inadvertent movement of the rotating member 60 out of the locked position, such as due to vibration.

With embodiments, a rotating member 60 may, at least initially, be connected with the body 30, such as with the inner surface of the first aperture 32 via one or more connection segments $90_N$ (see, e.g., FIG. 8A). For example and without limitation, the connector assembly 20 may include a first connection segment $90_1$, a second connection segment $90_2$, and/or a third connection segment $90_3$. The connection segments $90_N$ may be disposed (e.g., evenly or unevenly) about an inner surface of the first aperture 32 and an outer surface of the rotating member 60. The connection segments $90_N$ may at least temporarily connect/fix the rotating member 60 with the body 30.

In embodiments, such as generally illustrated in FIG. 8B, applying a force or torque (e.g., a breaking force or torque) to rotate the rotating member 60 may cause the connection segments $90_N$ to break (e.g., sever, deform, split, snap, etc.). Severing the connection segments $90_N$ may result in portions of the connection segments $90_N$ remaining on the rotating member 60 and/or the body 30 (see, e.g., FIG. 8C). For example and without limitation, the first connection segment $90_1$ may break resulting in a first portion $90A_1$ of the first connection segment $90_1$ disposed on the rotating member 60, and/or a second portion $90B_1$ of the first connection segment $90_1$ disposed on the body 30. The second connection segment $90_2$ may break resulting in a first portion $90A_2$ of the second connection segment $90_2$ disposed on the rotating member 60, and/or a second portion $90B_2$ of the second connection segment $90_2$ disposed on the body 30. The third connection segment $90_3$ may break resulting in a first portion $90A_3$ of the third connection segment $90_3$ disposed on the rotating member 60, and/or a second portion $90B_3$ of the third connection segment $90_3$ disposed on the body 30. The connection segments $90_N$ may be configured to be broken/severed upon application of a breaking force or torque, which may be less than a locking force or torque.

In embodiments, such as generally illustrated in FIGS. 7A, 8A, and 9A, in an initial configuration, a body 30 may be disposed at a distance from the mating member 100, and the rotating member 60 may be disposed in an unlocked position. The rotating member 60 may be inserted into the first aperture 32 in the unlocked position, and/or the rotating member 60 may, for example and without limitation, be formed (e.g., via extrusion, additive manufacturing, thermoforming, etc.) with the rotating member 60 in the second aperture 34 in the unlocked position.

In embodiments, when the rotating member 60 is rotated from the unlocked position to the locked position, contact between the flange 70 and the latch 102 of mating member 100 may cause the rotating member 60 to move, at least to some degree, in a direction away from the latch 102. For example and without limitation, the rotating member 60 may initially be disposed in a center of the first aperture 32, such as when fixed to the body 30 via connection segments $90_N$, and, as the flange 70 of the rotating member 60 rotates into engagement with the latch 102 of the mating member 100, the engagement may cause an axis 60A of the rotating member 60 to shift from a first position (see, e.g., FIG. 8A) that may be generally centered in the first aperture 32, to a second position (see, e.g., FIG. 8C) that may be offset from the first position, such as away from the latch 102 in an X-direction. The flange 70 may extend outward at an appropriate distance such that the flange 70 may limit movement of the mating member 100 even when the rotating member 60 is not centered within the first aperture 32.

With embodiments, when the rotating member 60 is in the unlocked position, the protrusions $68_N$ may be at least partially aligned with the recesses 50, 52, 54 of the body 30. In embodiments, such as generally illustrated in FIG. 7A, when the rotating member 60 is in the unlocked position, the first portion 62 of rotating member 60 may be disposed at a first distance $D_1$ (e.g., in a Z-direction) away from the first side 30A of the body 30. The rotating member 60 may, for example and without limitation, be disposed at the first distance $D_1$ when the protrusions $68_N$ are not in contact with the contact portions 40. When the rotating member 60 is in the unlocked position, the first portion 62 may be disposed at the first distance $D_1$ from the first side 30A, and the flange 70 may not restrict movement of the latch 102 (e.g., the engagement portion 104), such as in an X-direction. When the rotating member 60 is in the unlocked position, the latch 102 may be moved (e.g., pinched, deformed, etc.) such that the engagement portion 104 is substantially aligned (e.g., in the Z-direction) with the second aperture 34 such the engagement portion 104 may move through the second aperture 34. In an unlocked position, such as generally illustrated in FIG. 8A, the flange 70 may be offset from and/or not be visible through the second aperture 34.

In embodiments, such as generally illustrated in FIGS. 7A-9C, the rotating member 60 may be configured to move (e.g., rotate) between the unlocked position and the locked position, such as to selectively restrict movement of the latch 102 the of the mating member 100 relative to the body 30. For example and without limitation, the rotating member 60 may rotate about 90 degrees, which may correspond to (e.g. be less than) an angular distance between protrusions $68_N$, from the first position to the second position. As the rotating member 60 rotates between the first and second positions, the protrusions $68_N$ may rotate into contact/engagement with the contact portions $40_N$. For example and without limitation, the protrusion $68_N$ may move from contacting the first ends $40A_N$ of the contact portions $40_N$ to contacting the second ends $40B_N$ of the contact portions $40_N$. If the contact portions $40_N$ include ramped configurations, movement of the protrusions $68_N$ along the contact portions $40_N$ may cause the rotating member 60 to move in a Z-direction, such as from being disposed at the first distance $D_1$ away from the first side 30A of the body 30 (see, e.g., FIGS. 7A and 9A) to being in contact with the first side 30A of the body 30 (see, e.g., FIGS. 7C and 9C). The displacement in the Z-direction of the rotating member 60 may be substantially equal to the distance $D_2$ that the contact portions $40_N$ may extend from the second side 30B of the body 30 (e.g., a height of the contact portions $40_N$).

With embodiments, such as generally illustrated in FIGS. 7C, 8C, 9C, and 10, when the rotating member 60 is in a locked position, the rotating member 60 may at least partially limit movement of the latch 102 of the mating member 100, which may restrict disconnection of the mating member 100 from the body 30. When the rotating member 60 is in the locked position, the protrusions $68_N$ may be in contact with the second ends $40B_N$ of the contact portions $40_N$. If the rotating member 60 is rotated past the locked position, the protrusions $68_N$ may slide off the ends $40B_N$ and the rotating member 60 may move in a Z-direction, at least to some degree, such as out of contact with the first side 30A of the body 30. Rotating the rotating member 60 past the locked position may indicate that an error or malfunction has occurred. For example and without limitation, the rotating member 60 may be rotated past the locked position if excess torque is applied to the rotating member 60 (e.g., a torque above a locking torque), if the latch 102 is not present (e.g., if not inserted into the second aperture 34) or is broken, if the body 30 has been damaged, and/or if the rotating member 60 has been damaged, among other potential errors or malfunctions. Movement of the rotating member 60 in a Z-direction when rotated past a locked position may provide tactile feedback to a user that an error or malfunction has occurred.

In embodiments, if the rotating member 60 is rotated past the locked position, the rotating member 60 may be disposed in a second unlocked position. In the second unlocked position, the first protrusion $68_1$ may be disposed at least partially between (e.g., circumferentially) the first contact portion $40_1$ and the second contact portion $40_2$, the second protrusion $68_2$ may be disposed at least partially between the second contact portion $40_2$ and the third contact portion $40_3$, and/or the third protrusion 683 may be disposed at least partially between the third contact portion $40_3$ and the first contact portion $40_1$. From the second unlocked position, the rotating member 60 may be rotated further, such as toward a second locked position in which the first protrusion $68_1$ may be in contact with the second contact portion $40_2$, the second protrusion $68_2$ may be in contact with the third contact portion $40_3$, and/or the third protrusion 683 may be in contact with the first contact portion $40_1$, such as at or about ends $40B_2$, $40B_3$, and $40B_1$, respectively.

Figures 7B, 7C:
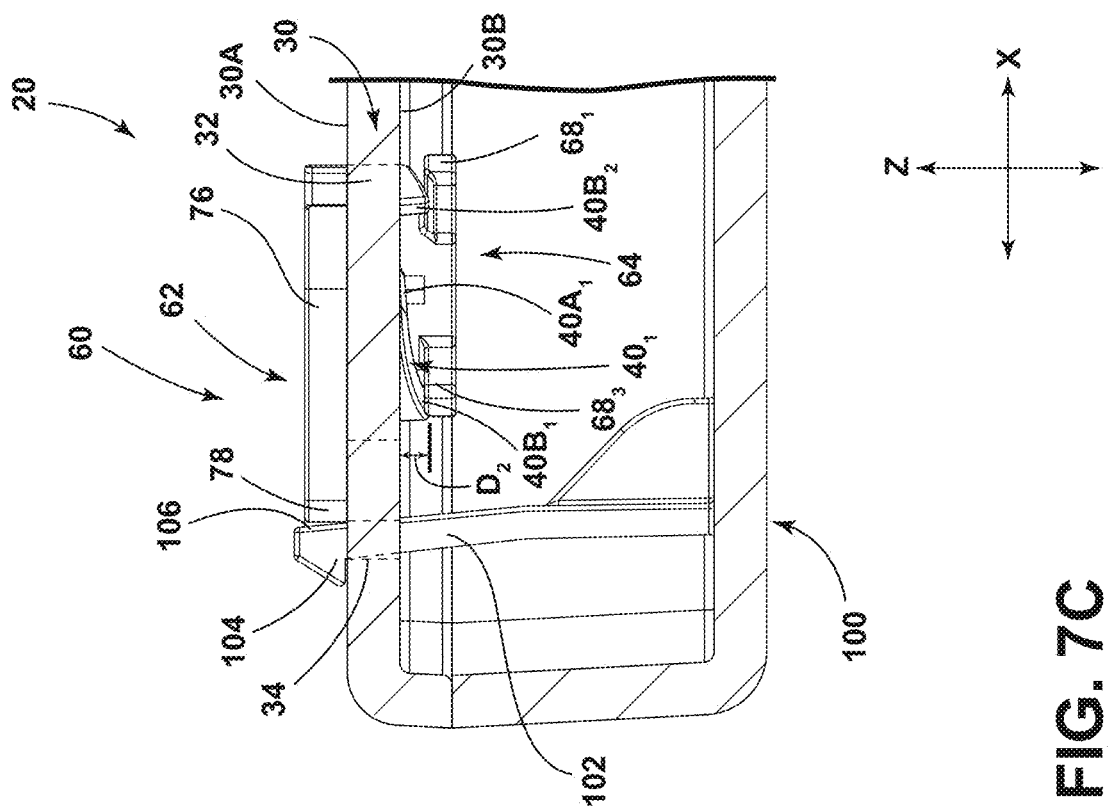
FIG. 7C is a cross-sectional side view generally illustrating portions of an embodiment of a connector assembly in a locked position according to teachings of the present disclosure.

In embodiments, such as generally illustrated in FIGS. 7C and 10, when the rotating member 60 is in a locked position, the flange 70 may engage and/or be in contact with the latch 102 of the mating member 100. For example and without limitation, the ridges 86 of the flange 70 may at least partially engage the grooves 106 of the mating member 100, such as to limit rotation of the flange 70 out of engagement with the latch 102. Engagement between the grooves 106 and the ridges 86 may limit the rotating member 60 from rotating in a second direction (e.g., an unlocking direction that may be opposite the first/locking direction of rotation) from the locked position to the unlocked position. When the rotating member 60 is moved to the locked position, the contact surface 78 of the flange 70 may overlap in the Z-direction with the second aperture 34 such as to move the engagement portion 104 in an X-direction (e.g., away from the rotating member 60) and/or to move the rotating member 60 in the first aperture 32 (e.g., in an X-direction away from the latch 102). Movement of the mating member 100 in the X-direction (e.g., away from the rotating member 60) may substantially limit alignment of the mating member 100 with the second aperture 34 in the Z-direction, which may restrict the engagement portion 104 from moving out of engagement/contact with the first side 30A of the body 30.

Figure 11:
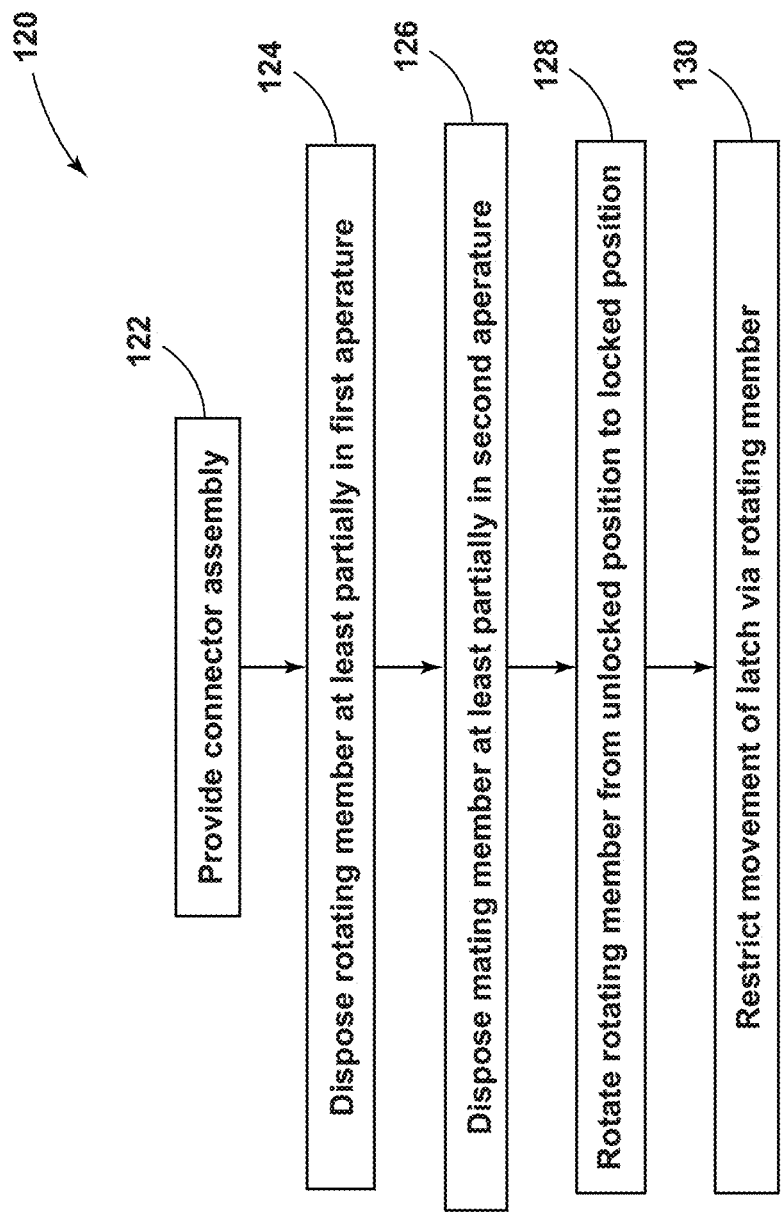
FIG. 11 is a flowchart generally illustrating a method of assembling a connector assembly according to teachings of the present disclosure.
Figure 12:
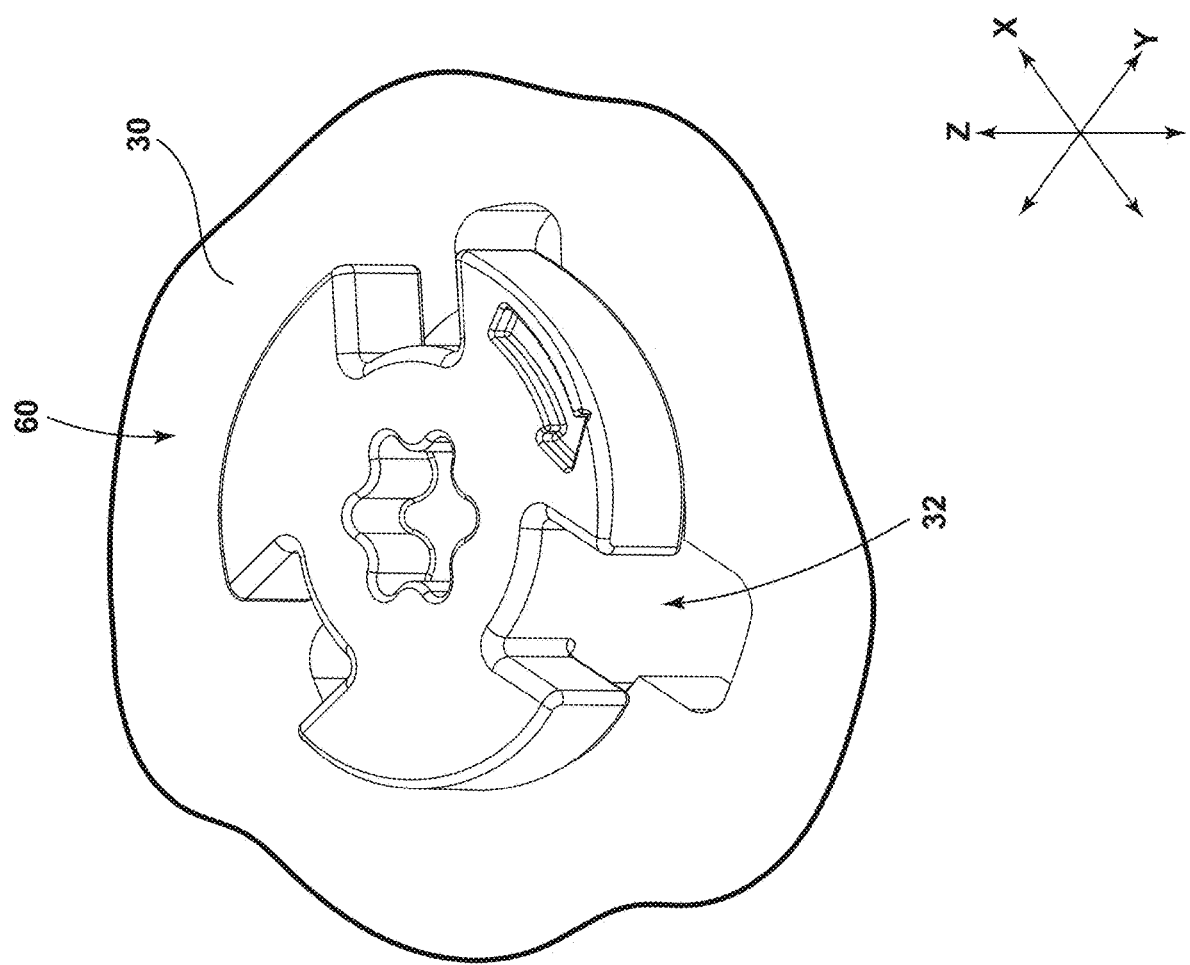
FIG. 12 is a perspective view generally illustrating portions of an embodiment of a connector assembly according to teachings of the present disclosure.

With embodiments, such as generally illustrated in FIG. 11, a method 120 of assembling a connector assembly 20 may include providing a body 30, a rotating member 60, and/or a mating member 100 (step 122). The method 120 may include disposing the rotating member 60 at least partially within a first aperture 32 of the body 30 (step 124). Disposing the rotating member 60 may include inserting (e.g., in the Z-direction) the rotating member 60 at least partially through the first aperture 32, and/or forming the rotating member 60 within the first aperture 32 (e.g., as an integral part of the body 30). For example and without limitation, the body 30 and the rotating member 60 may, at least initially, be provided/formed as a monolithic (e.g., single, unitary) component. The method 120 may include moving the body 30 and the mating member 100 toward each other such that a latch 102 of the mating member 100 is disposed at least partially in a second aperture 34 of the body 30 (step 126). Disposing the latch 102 at least partially in the aperture may include inserting (e.g., in the Z-direction) the latch 102 and/or the engagement portion 104 of the latch 102 through the second aperture 34 such that the engagement portion 104 is disposed on the first side 30A of the body 30 and snaps into engagement with the body 30.

In embodiments, the method 120 may include rotating the rotating member 60, such as from an unlocked position toward a locked position (step 128). Rotating the rotating member 60 may include applying a breaking torque to the rotating member 60 to break one or more connection segments $90_N$. Additionally or alternatively, rotating the rotating member 60 may include one or more protrusions $68_N$ of the rotating member 60 moving along one or more respective contact portions $40_N$ of the body 30. Movement of the protrusions $68_N$ along the contact portions 40 may move the rotating member 60 in a Z-direction. For example and without limitation, the first portion 62 of the rotating member 60 may move from a position where the first portion 62 is not in contact with the first side 30A of the body 30 to a position where the first portion 62 is in contact with the first side 30A of the body 30. Rotating the rotating member 60 may include rotating the rotating member 60 until a locking torque is achieved. The locking torque may include a torque value or a range of torque values associated with rotating the rotating member 60 such that flange 70 engages the latch 102 while the one or more protrusions $68_N$ are in contact with a respective contact portion $40_N$ (e.g., without the one or more protrusions $68_N$ moving beyond/off the second ends $40B_N$ of the contact portions $40_N$). If a torque greater than the locking torque (e.g., an excessive torque) is applied to the rotating member 60, the one or more protrusions $68_N$ may move beyond/off the second ends $40B_N$ of the contact portions $40_N$, which may provide a tactile indication that an excessive force has been applied and/or may result in the rotating member 60 being disposed in a second unlocked position.

With embodiments, the method 120 may include restricting, via the rotating member 60, movement of the latch 102 (step 130), such as to prevent the latch 102 from disengaging from the body 30 and/or the second aperture 34. Restricting movement of the latch 102 may include a flange 70 of the rotating member 60 engaging (e.g., via a toothed engagement) an engagement portion 104 of the latch 102, which may limit movement (e.g., in an X-direction) of the latch 102 towards the rotating member 60 and/or prevent the engagement portion 104 from aligning with the second aperture 34. Restricting movement of the latch 102 may restrict disengagement of the latch 102 from the body 30, which may restrict and/or prevent disconnection of the mating member 100 from the body 30.

With embodiments, a body 30, a rotating member 60, and/or a mating member 100 of a connector assembly 20 may include one or more of a variety of materials. For example and without limitation, the body 30, the rotating member 60, and/or the mating member 100 may include metal, plastic, and/or a polymer. In some configurations, some or all of the body 30, the rotating member 60, and/or the mating member 100 may comprise the same material (e.g., a plastic/polymer).

In embodiments, one or more portions of a connector assembly 20 may, for example and without limitation, be formed via injection molding. For example, the body 30 and/or the rotating member 60 may be formed via injection molding, such as in a single injection molding process that may form the body 30 and the rotating member 60, initially, as a single, unitary/monolithic component. In embodiments, one or more recesses 50, 52, 54, $80_N$ may be provided to facilitate formation (e.g., injection molding) of portions of a connector assembly 20.

With embodiments, such as generally illustrated in FIGS. 12-17, a connector assembly 20 may include a body 30, a rotating member 60, and/or a mating member 100. The rotating member 60 may be configured to connect the body 30 with the mating member 100, for example, to restrict relative movement between the body 30 and the mating member 100. The mating member 100 may include a mating member aperture 200 that may be configured to at least partially receive the rotating member 60. For example, the rotating member 60 may extend into the first aperture 32 and the mating member aperture 200 to connect the body 30 and the mating member 100.

In embodiments, such as generally illustrated in FIGS. 14B, 15, 16, and 17, the mating member 100 may include one or more contact portions $240_N$ (e.g., contact portions $240_1$, $240_2$, $240_3$) that may extend (e.g., perpendicularly) from a surface of the mating member 100, such as away from the body 30. The one or more contact portions $240_N$ may, for example, be configured in the same or a similar manner as contact portions $40_N$ of a body 30. For example, the contact portions $240_N$ may include a rounded/arced and/or ramped configuration. The contact portions $240_N$ may be disposed about the mating member aperture 200, such as in an equally spaced configuration.

In embodiments, if a mating member 100 includes contact portions $240_N$, the body 30 may not include contact portions $40_N$. In such embodiments, for example, a rotating member 60 may be configured to directly connect a body 30 and a mating member 100 (e.g., as opposed to restricting movement of a latch 102 that may directly connect a body 30 and a mating member 100). In some embodiments, a body 30 may include contact portions $40_N$, such as for a first rotating member 60, and a mating member 100 may include contact portions $240_N$, such as for a second rotating member 60.

With embodiments, such as generally illustrated in FIGS. 14B, 15, 16, and 17, one or more contact portions $240_N$ (and/or contact portions $40_N$) may include a recess $242_N$ (e.g., recesses $242_1$, $242_2$, $242_3$) that may be configured to at least partially receive a protrusion $68_N$ of the rotating member 60, such as to restrict rotational movement of the rotating member 60 relative to the mating member 100. For example, as the rotating member 60 rotates when disposed in the first aperture 32 and the mating member aperture 200, the one or more protrusions $68_N$ may slide along/up the contact portions $240_N$ until the one or more protrusions $68_N$ are aligned with and/or slide at least partially into (e.g., snap into) a respective recess $242_N$. Movement of one or more protrusions $68_N$ at least partially into a recess $242_N$ may, for example, provide tactile feedback to a user of the connector assembly 20 that may indicate that the connection is sufficient/complete. If the connection is incomplete/insufficient, such as if the body 30 and the mating member 100 are not properly aligned, the one or more protrusions $68_N$ may not move into respective recesses $242_N$, which may provide an indication that the connection is incomplete/insufficient.

Figure 13:
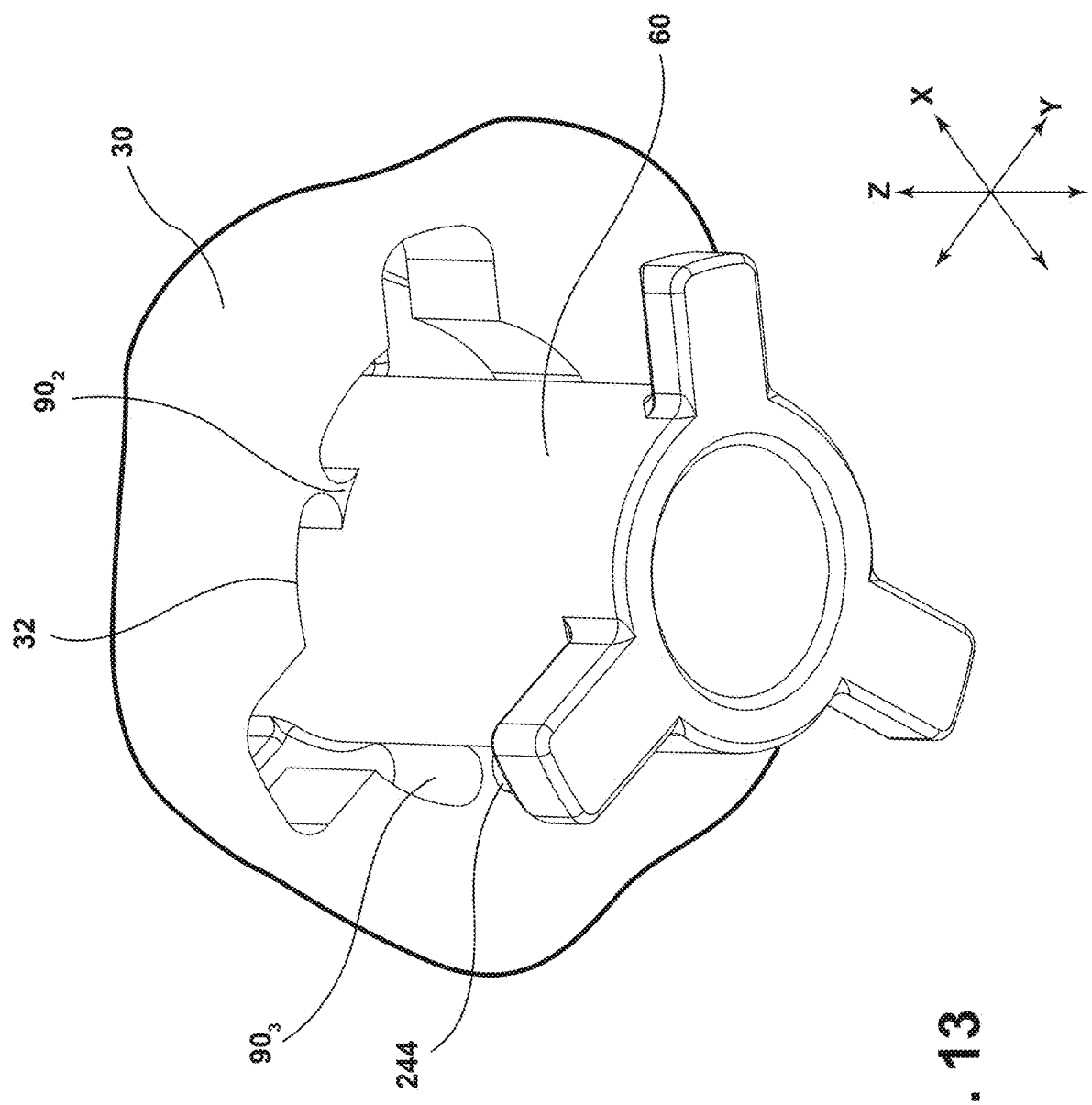
FIG. 13 is a perspective view generally illustrating portions of an embodiment of a connector assembly according to teachings of the present disclosure.
Figure 14B:
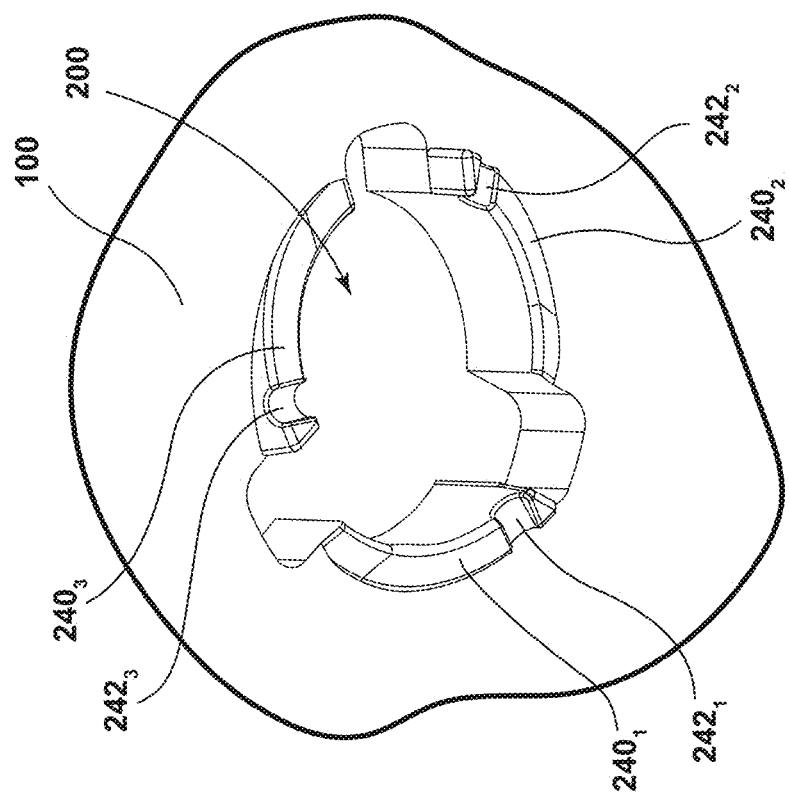
FIGS. 14A and 14B are perspective views generally illustrating portions of an embodiment of a mating member of a connector assembly according to teachings of the present disclosure.
Figure 14A:
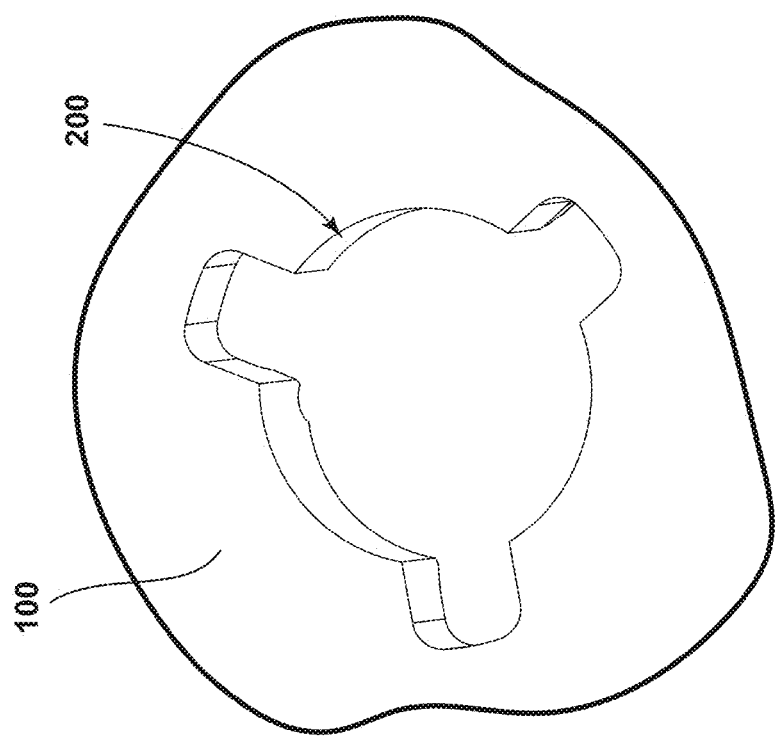
Figure 15:
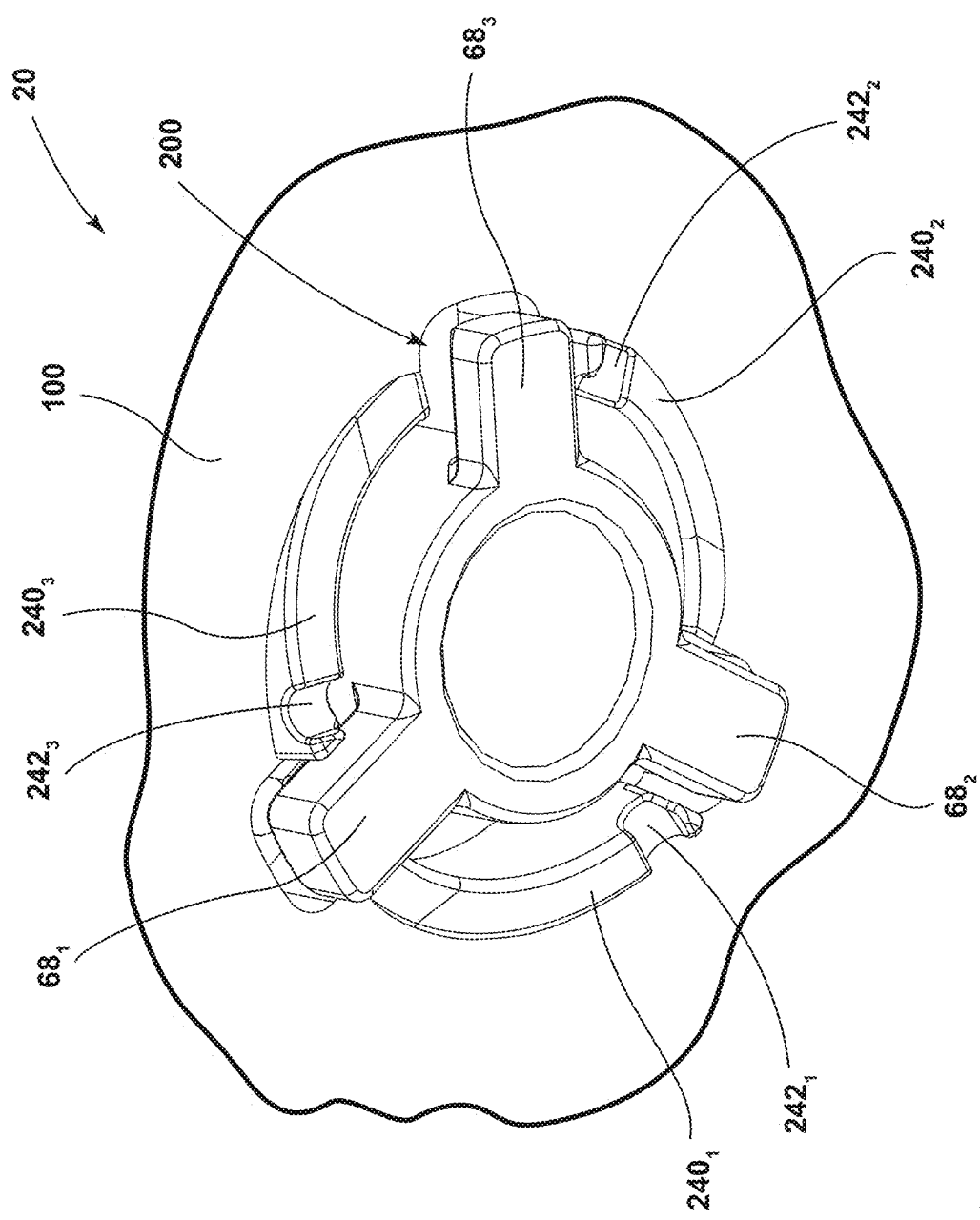
FIG. 15 is a perspective view generally illustrating portions of an embodiment of a connector assembly according to teachings of the present disclosure.
Figure 16:
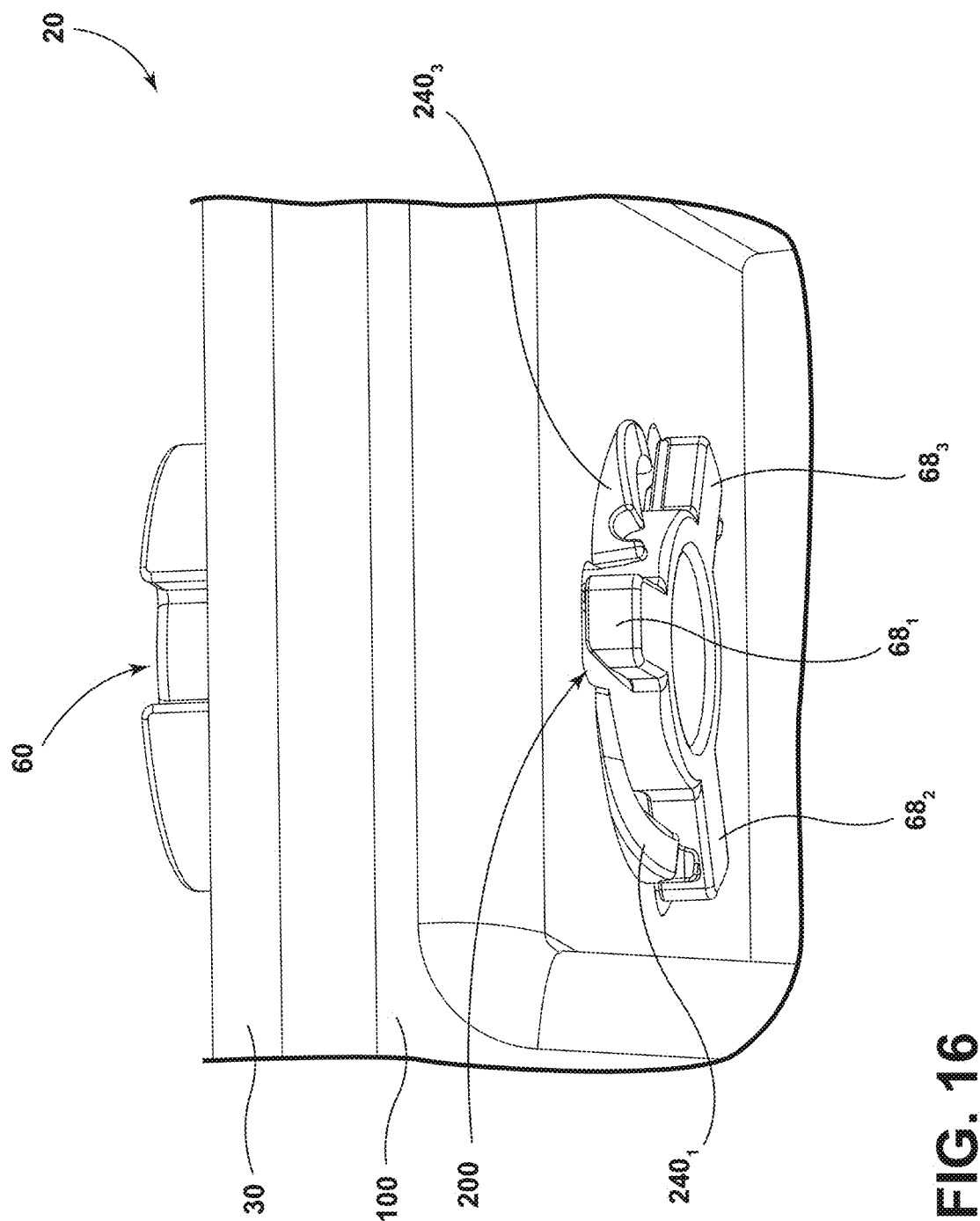
FIG. 16 is a perspective view generally illustrating portions of an embodiment of a connector assembly according to teachings of the present disclosure.

In embodiments, such as generally illustrated in FIG. 13, one or more protrusions $68_N$ may include a tab 244 that may extend from a protrusion $68_N$, such as in a generally axially direction toward the first portion 62. The recesses $242_N$ may be configured to at least partially receive a respective tab 244. For example, upon sufficient rotation of the rotating member 60, one or more tabs 244 may snap into the recesses 242$_N$, which may restrict further rotation of the rotating member 60.

Figure 17:
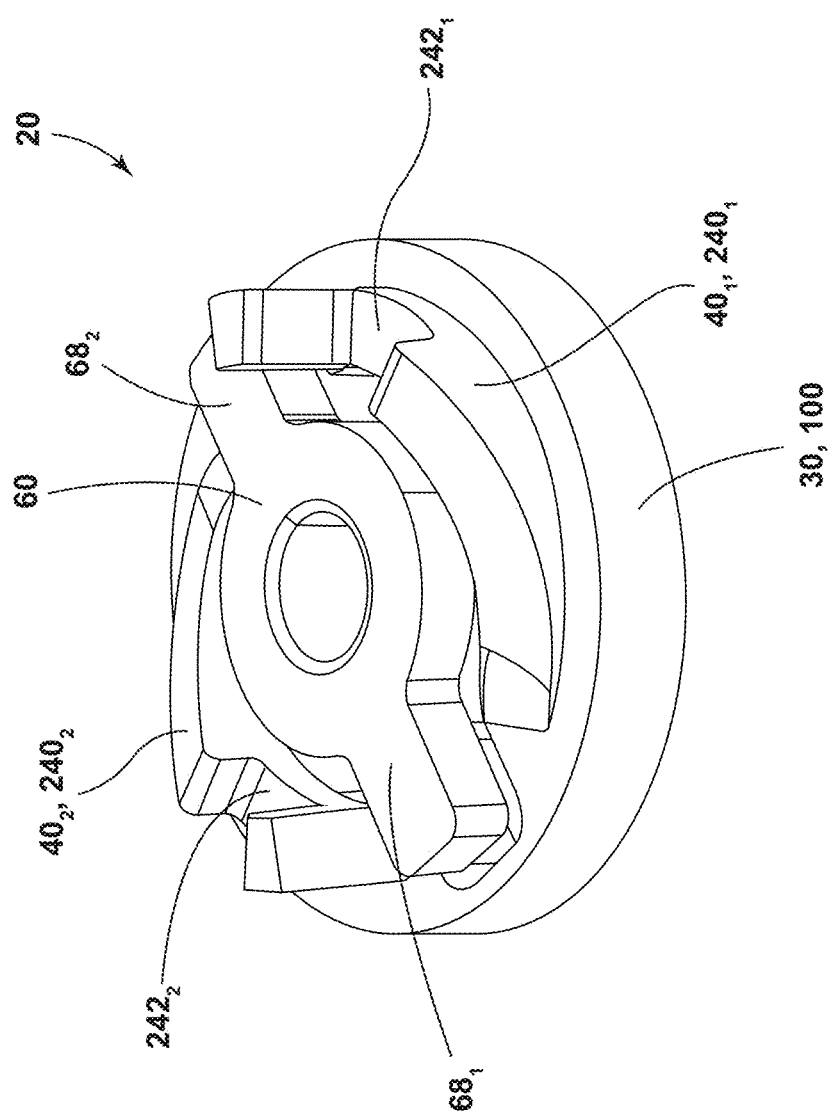
FIG. 17 is a perspective view generally illustrating portions of an embodiment of a connector assembly according to teachings of the present disclosure.

With embodiments, such as generally illustrated in FIG. 17, one or more recesses 242$_N$ may be configured to substantially receive respective protrusions 68$_N$. For example and without limitation, a circumferential extent of the one or more recesses 242$_N$ may be at least as large as the circumferential extent of the protrusions 68$_N$, and/or the axial extent of the one or more recesses 242$_N$ may be at least half as large, about as large, or larger than the axial extents of the protrusions 68$_N$. In some embodiments, for example and without limitation, a rotating member 60 may include two protrusions 68$_N$ (e.g., 68$_1$, 68$_2$) and a corresponding body 30 or mating member 100 may include two contact portions 40$_N$, 240$_N$. Other embodiments of a rotating member 60 may include other numbers of protrusions 68$_N$. Other embodiments of a body 30 and/or a mating member 100 may include other numbers of contact portions 40$_N$, 240$_N$.

Figure 18:
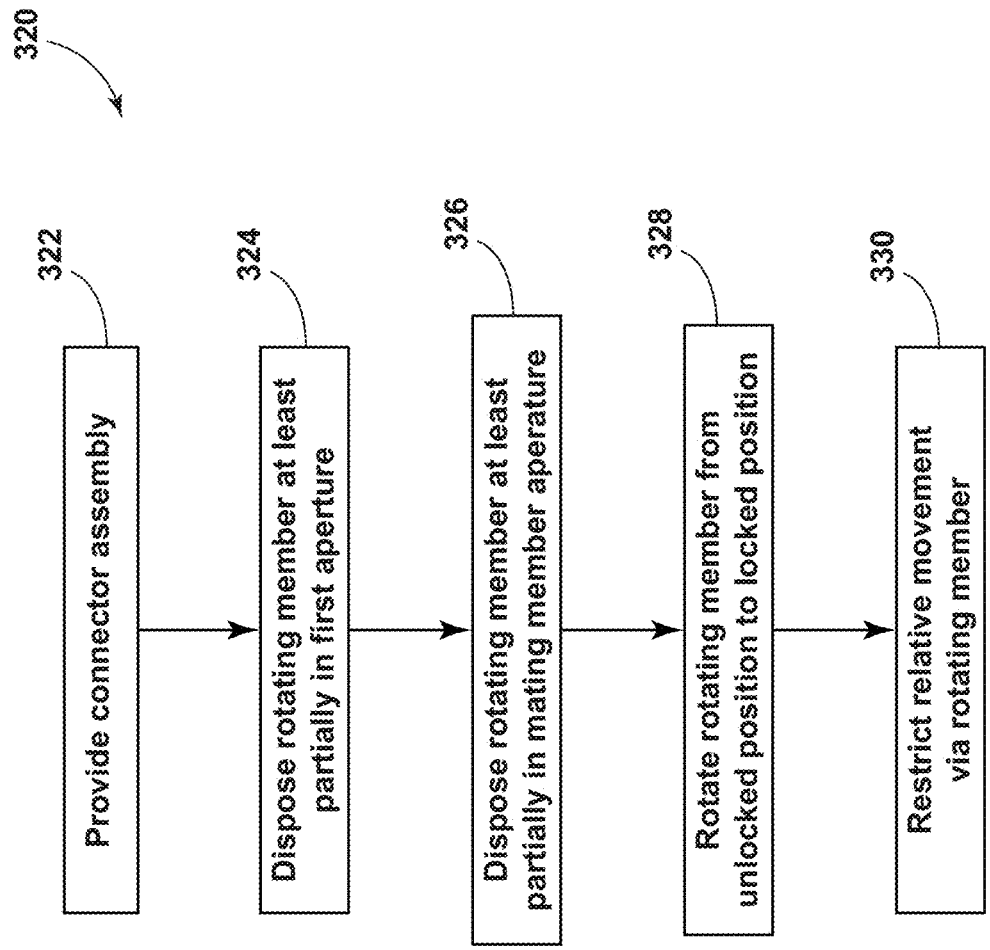
FIG. 18 is a flowchart generally illustrating an embodiment of a method of assembling a connector assembly according to teachings of the present disclosure.

In embodiments, such as generally illustrated in FIG. 18, a method 320 of operating a connector assembly 20 may include providing a connector assembly 20 (step 322). A connector assembly 20 may include a body 30 (e.g., a first housing member), a rotating member 60, and/or a mating member 100 (e.g., a second housing member). With embodiments, providing a connector assembly 20, a body 30, and/or one or more rotating members 60 may include forming the one or more rotating members 60 with the body 30, at least initially, as a monolithic component (e.g., a plurality of rotating members 60, which may have different configurations, may be integrally formed with the body 30). The method 320 may include disposing the rotating member 60 at least partially in a first aperture 32 of the body 30 (step 324) and/or at least partially in a mating member aperture 200 of the mating member 100 (step 326). The method 320 may include rotating the rotating the rotating member 60 from an unlocked position to a locked position (step 328). The method 320 may include restricting (e.g., directly) relative movement between the body 30 and the mating member 100 via the rotating member 60 (step 330), such as while the rotating member 60 is in the locked position.

Figure 19:
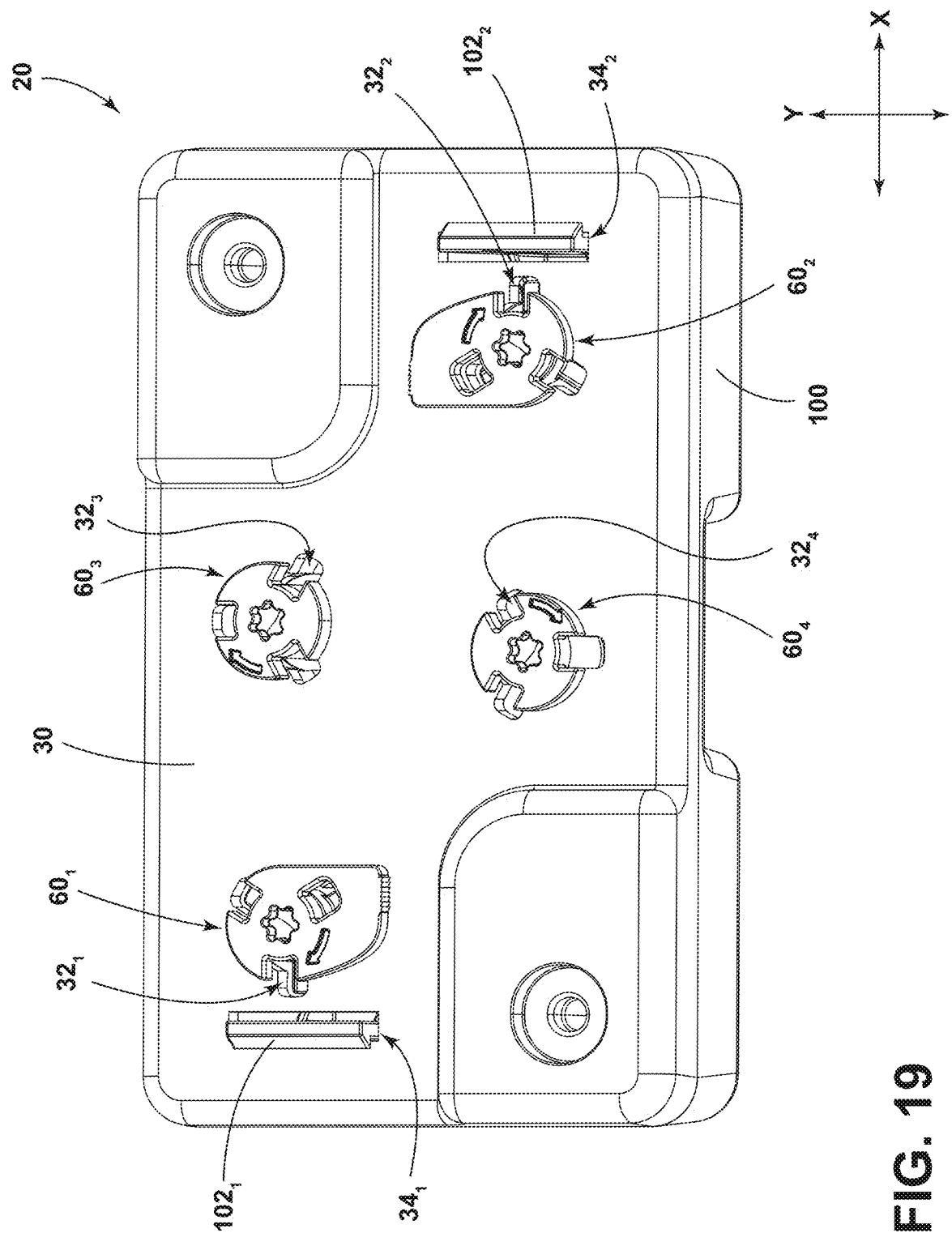
FIG. 19 is a perspective view generally illustrating portions of an embodiment of a connector assembly including a body, a mating member, and a plurality of rotating members according to teachings of the present disclosure.
Figure 20:
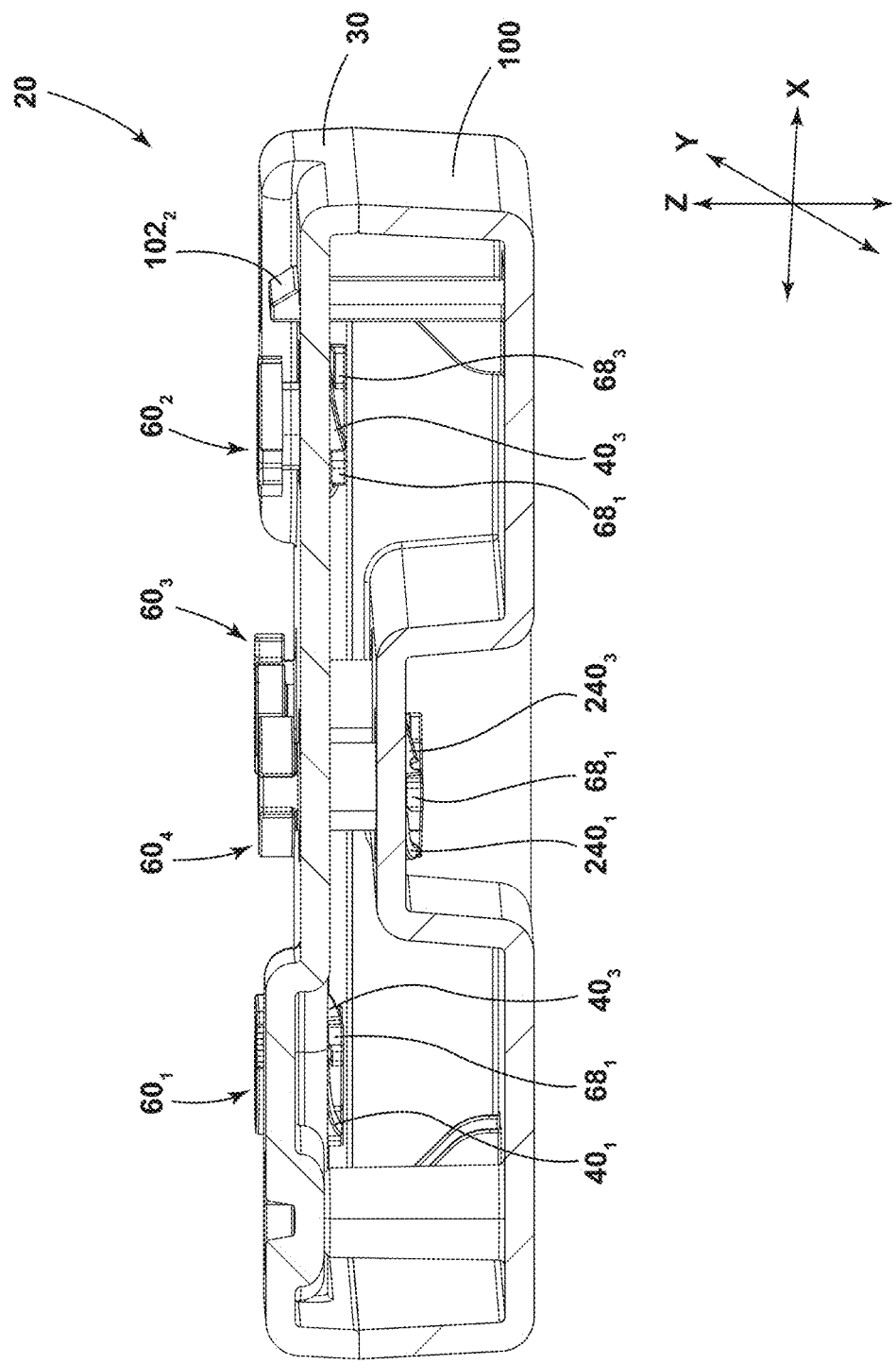
FIG. 20 is a cross-sectional view generally illustrating portions of an embodiment of a connector assembly including a body, a mating member, and a plurality of rotating members according to teachings of the present disclosure.

In embodiments, such as generally illustrated in FIGS. 19 and 20, a connector assembly 20 may include a body 30, a mating member 100, and/or a plurality of rotating members 60$_N$ (e.g., rotating members 60$_1$, 60$_2$, 60$_3$, 60$_4$). The rotating members 60$_N$ may be disposed in respective first apertures 32N (e.g., first apertures 32$_1$, 32$_2$, 32$_3$, 32$_4$) of the body 30. The mating member 100 may include one or more latches (e.g., latches 102$_1$, 102$_2$) that may be disposed in and/or engaged with respective second apertures 34N (e.g., second apertures 34$_1$, 34$_2$) of the body 30.

In embodiments, the plurality of rotating members 60$_N$ may include one or a plurality of configurations. For example and without limitation, rotating members 60$_1$, 60$_2$ may include a first configuration and/or rotating members 60$_3$, 60$_4$ may include a second configuration. Rotating members 60$_1$, 60$_2$ may engage contact portions 40$_N$ of the body 30 and/or may be configured to limit movement of latches 102$_1$, 102$_2$ of the mating member 100. Additionally or alternatively, protrusions 68$_N$ of rotating members 60$_3$, 60$_4$ may engage contact portions 240$_N$ of the mating member 100, and/or rotating members 60$_3$, 60$_4$ may directly restrict relative movement (e.g., at least Z-direction movement) of the body 30 and the mating member 100.

With embodiments, rotating members 60$_1$, 60$_2$ may have shorter axial lengths (e.g., in a Z-direction) than the rotating members 60$_3$, 60$_4$. For example and without limitation, rotating members 60$_1$, 60$_2$ may extend through the body 30 (e.g., and not the mating member 100), and/or rotating members 60$_3$, 60$_4$ may be longer, such as to extend through the body 30 and the mating member 100. The height (e.g., in a Z-direction) of the mating member 100 may be smaller proximate the rotating members 60$_3$, 60$_4$ than proximate the rotating members 60$_1$, 60$_2$.

In embodiments, a first portion 62 and/or a second portion 64 of a rotating member 60 may include a greater outer diameter than a third portion 66. Additionally or alternatively, the first portion 62 and/or the second portion 64 may include greater outer diameters than some or most of a first aperture 32 of a body 30 (e.g., other than at or about recesses 50, 52, 54) and/or greater than some or most of a mating member aperture 200 of a mating member 100. With embodiments, protrusions 68$_N$ of a rotating member 60 may, for example and without limitation, extend substantially in a common plane (e.g., an X-Y plane) that may be parallel to the first portion 62 and/or the body 30.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or nonfunctional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A connector assembly, comprising:
a body including a first aperture and a second aperture;
a rotating member disposed at least partially in the first aperture; and
a mating member having a portion disposed at least partially in the second aperture;
wherein the rotating member is configured to rotate to limit movement of the mating member; and
the body and the rotating member are configured such that the rotating member is removable from the body.

2. The connector assembly of claim 1, wherein the portion includes a latch; and
the rotating member is configured to rotate in the first aperture to restrict movement of the latch of the mating member toward the rotating member.

3. The connector assembly of claim 1, wherein the rotating member includes a first portion disposed at a first side of the body and a second portion disposed at a second side of the body;
the body includes a contact portion extending from the second side of the body; and
the second portion is configured to engage the contact portion.

4. The connector assembly of claim 3, wherein the contact portion is configured such that during rotation of the rotating member, a protrusion of the second portion engages the contact portion and moves the rotating member in a direction substantially perpendicular to the body.

5. The connector assembly of claim 3, wherein a recess extends from the first aperture; and
in an unlocked position of the rotating member, (i) a protrusion of the second portion is substantially aligned with the recess, and (ii) a contact flange of the rotating member is disengaged from the mating member such that the rotating member does not materially limit movement of the mating member out of the second aperture.

6. The connector assembly of claim 3, wherein the rotating member includes an unlocked position and a locked position;
when the rotating member is in the unlocked position, the first portion of the rotating member is disposed at a distance from the first side of the body; and
when the rotating member is in the locked position, the first portion of the rotating member is in contact with the first side of the body.

7. The connector assembly of claim 3, wherein the rotating member, when moving from an unlocked position to a locked position, is configured to (i) rotate about an axis substantially perpendicular to the body, and (ii) move substantially perpendicular to the body and substantially parallel to the axis.

8. The connector assembly of claim 1, wherein, in an initial configuration, the rotating member is integrally formed with the body via one or more connection segments configured to be severed upon application of a breaking torque to the rotating member;
the rotating member includes a first unlocked position, a locked position, and a second unlocked position that is offset from the first unlocked position and the locked position; and
if a torque above a locking torque is applied to the rotating member while in the locked position, the rotating member is configured to rotate to the second unlocked position.

9. A connector assembly, comprising: a body including a first aperture;
a mating member; and
a rotating member disposed at least partially in the first aperture and configured to restrict relative movement between the body and the mating member, the rotating member including:
a body portion;
a head connected to a first end of the body portion; and
a plurality of protrusions extending radially outward from the body portion at or about a second end of the body portion, the protrusions configured to engage respective contact portions of the body or the mating member.

10. The connector assembly of claim 9, wherein the mating member includes the contact portions;
the contact portions are disposed about a mating member aperture of the mating member;
the rotating member is disposed at least partially in the mating member aperture;
the contact portions are ramped and arced; and
the plurality of protrusions are configured to slide along the contact portions as the rotating member rotates to connect the body with the mating member.

11. The connector assembly of claim 10, including a second rotating member;
wherein the body includes a first additional aperture and a second additional aperture;
the second rotating member is disposed at least partially in the first additional aperture;
a latch of the mating member is disposed at least partially in the second additional aperture; and
the second rotating member is configured to rotate in the first additional aperture to selectively restrict movement of the latch relative to the body.

12. A method of operating the connector assembly of claim 9, the method including:
rotating the rotating member in the first aperture such that the plurality of protrusions of the rotating member engage the respective contact portions of the body or of the mating member, the contact portions extending substantially in an axial direction of the rotating member; and restricting, via the rotating member, relative movement between the body and the mating member.

13. The method of claim 12, wherein restricting relative movement includes restricting movement of a latch of the mating member to restrict disengagement of the latch from a second aperture of the body; and restricting movement of the latch includes limiting movement of the latch toward the rotating member in a first direction substantially parallel with the body.

14. The method of claim 12, wherein rotating the rotating member includes moving the rotating member from an unlocked position to a locked position about an axis substantially perpendicular to the body;

the contact portions include a ramped configuration such that the rotating member moves axially as the rotating member moves from the unlocked position to the locked position;

restricting the mating member includes a flange of a first portion of the rotating member engaging the mating member;

the protrusions extend from a second portion of the rotating member;

the first portion of the rotating member is disposed at a first side of the body; and the second portion is disposed at a second side of the body.

15. The method of claim 14, wherein moving the rotating member to the locked position includes moving the flange such that the flange covers a portion of a second aperture of the body; and a latch of the mating member is disposed at least partially in the second aperture.

16. The method of claim 12, wherein disposing the rotating member at least partially in the first aperture includes integrally forming the rotating member with the body via one or more connection segments such that the body and the rotating member are initially provided as a monolithic component.

17. The method of claim 16, wherein rotating the rotating member includes applying a breaking torque to the rotating member to break the one or more connection segments and rotating the rotating member to achieve a locking torque.

18. A connector assembly, comprising:
a body including a first aperture and a second aperture;
a rotating member disposed at least partially in the first aperture; and
a mating member having a portion disposed at least partially in the second aperture;
wherein the rotating member is configured to rotate to limit movement of the mating member;
the rotating member includes a first portion disposed at a first side of the body and a second portion disposed at a second side of the body;
the body includes a contact portion extending from the second side of the body; and
the second portion is configured to engage the contact portion;
the first portion includes a contact flange configured to engage the mating member to restrict movement of the mating member out of the second aperture when a protrusion of the second portion is in contact with the contact portion; and
the contact flange includes a substantially planar contact surface disposed substantially perpendicular to a plane of the body.

19. The connector assembly of claim 18, the rotating member and the first aperture are configured such that engagement between the contact flange and the mating member causes the rotating member to shift within the first aperture in a direction away from the second aperture and substantially parallel to the body.

20. The connector assembly of claim 18, wherein the body and the rotating member are configured such that the rotating member is removable from the body.

* * * * *